(12) United States Patent
Farmer et al.

(10) Patent No.: US 8,396,369 B1
(45) Date of Patent: Mar. 12, 2013

(54) METHOD AND SYSTEM FOR PROPAGATING UPSTREAM CABLE MODEM SIGNALS AND RF RETURN VIDEO CONTROL SIGNALS OVER THE SAME OPTICAL NETWORK

(75) Inventors: James O. Farmer, Cumming, GA (US); Paul F. Whittlesey, Suwanee, GA (US)

(73) Assignee: Aurora Networks, Inc., Santa Clara, CA (US)

( * ) Notice: Subject to any disclaimer, the term of this patent is extended or adjusted under 35 U.S.C. 154(b) by 1168 days.

(21) Appl. No.: 12/240,265

(22) Filed: Sep. 29, 2008

Related U.S. Application Data

(60) Provisional application No. 60/995,635, filed on Sep. 28, 2007.

(51) Int. Cl.
*H04B 10/00* (2006.01)
(52) U.S. Cl. ......... 398/116; 398/115; 398/185; 398/182
(58) Field of Classification Search ............... 398/182, 398/116, 115, 185
See application file for complete search history.

(56) References Cited

U.S. PATENT DOCUMENTS

| 2004/0121753 A1* | 6/2004 | Sugar et al. ............ 455/333 |
| 2006/0071756 A1* | 4/2006 | Steeves ............ 340/10.1 |
| 2006/0116127 A1* | 6/2006 | Wilhoite et al. ............ 455/442 |

* cited by examiner

*Primary Examiner* — Kinam Park
(74) *Attorney, Agent, or Firm* — Smith Risley; Steven P. Wigmore

(57) ABSTRACT

A method and system can propagate upstream cable modem signals and radio-frequency (RF) return video control signals over the same passive optical network (PON). The method and system can include various combinations of hardware and software to support this operation. Three exemplary embodiments of optical network terminals (ONT) of a DPON system improve performance of the system by ensuring that, in the event the upstream transmitters of two ONTs are turned on simultaneously, they will not interfere with each other. The system is designed such that in a situation of competing transmissions, the one which is received and processed by the head end out of two competing transmissions originating from a set top box and a cable modem, will be the one originating from the cable modem, which may use the DOCSIS cable modem protocol.

7 Claims, 14 Drawing Sheets

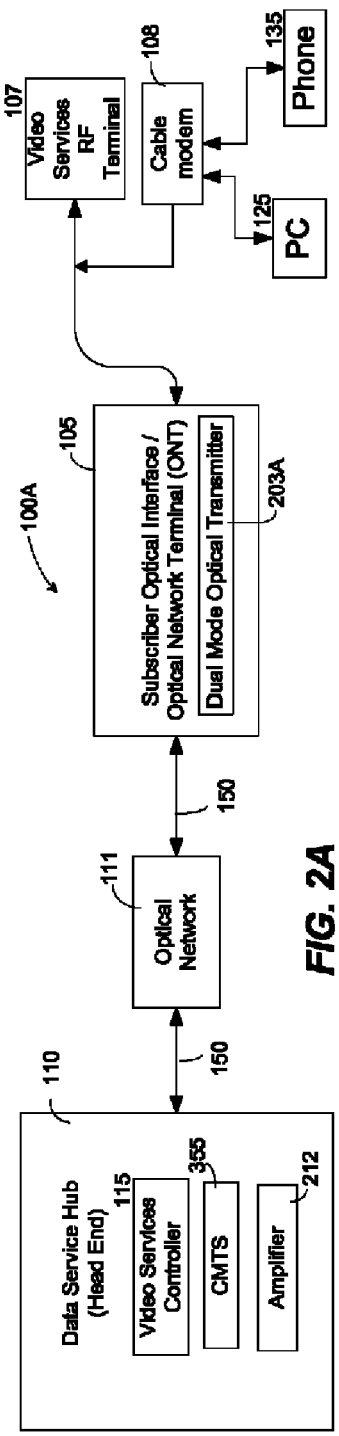
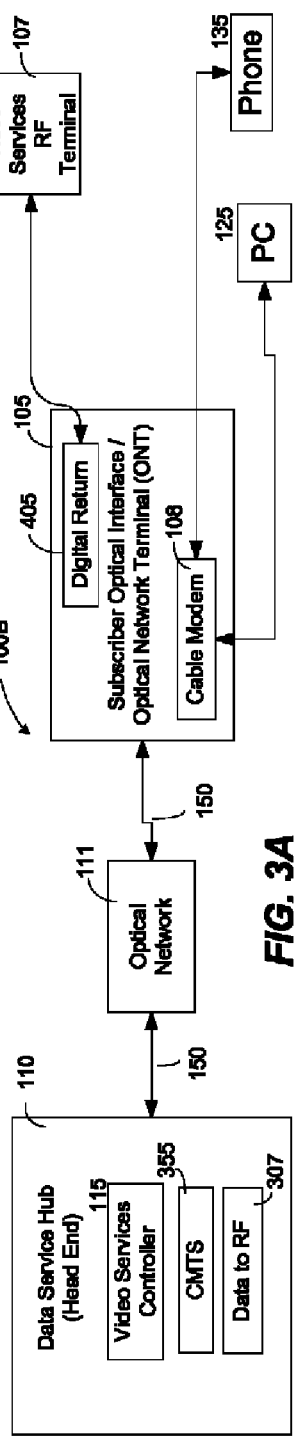
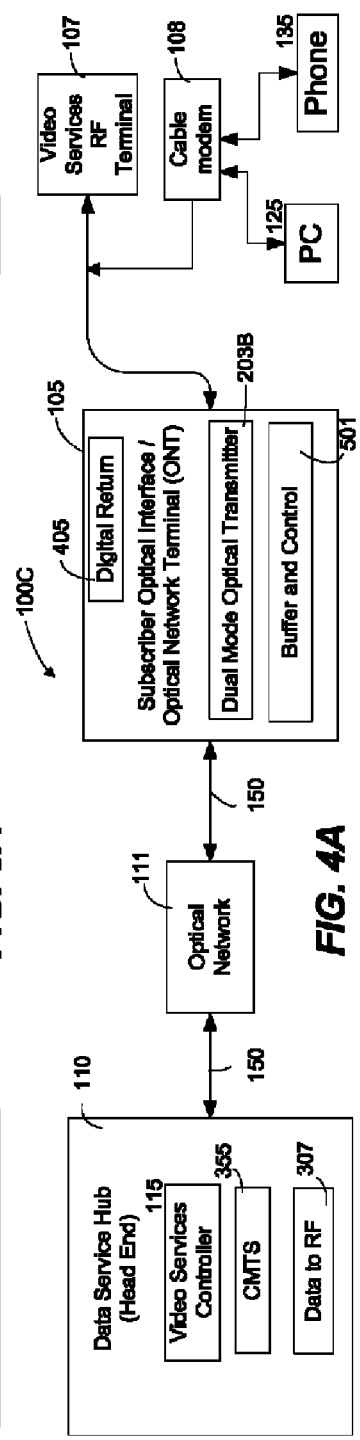
FIG. 2A
FIG. 3A
FIG. 4A

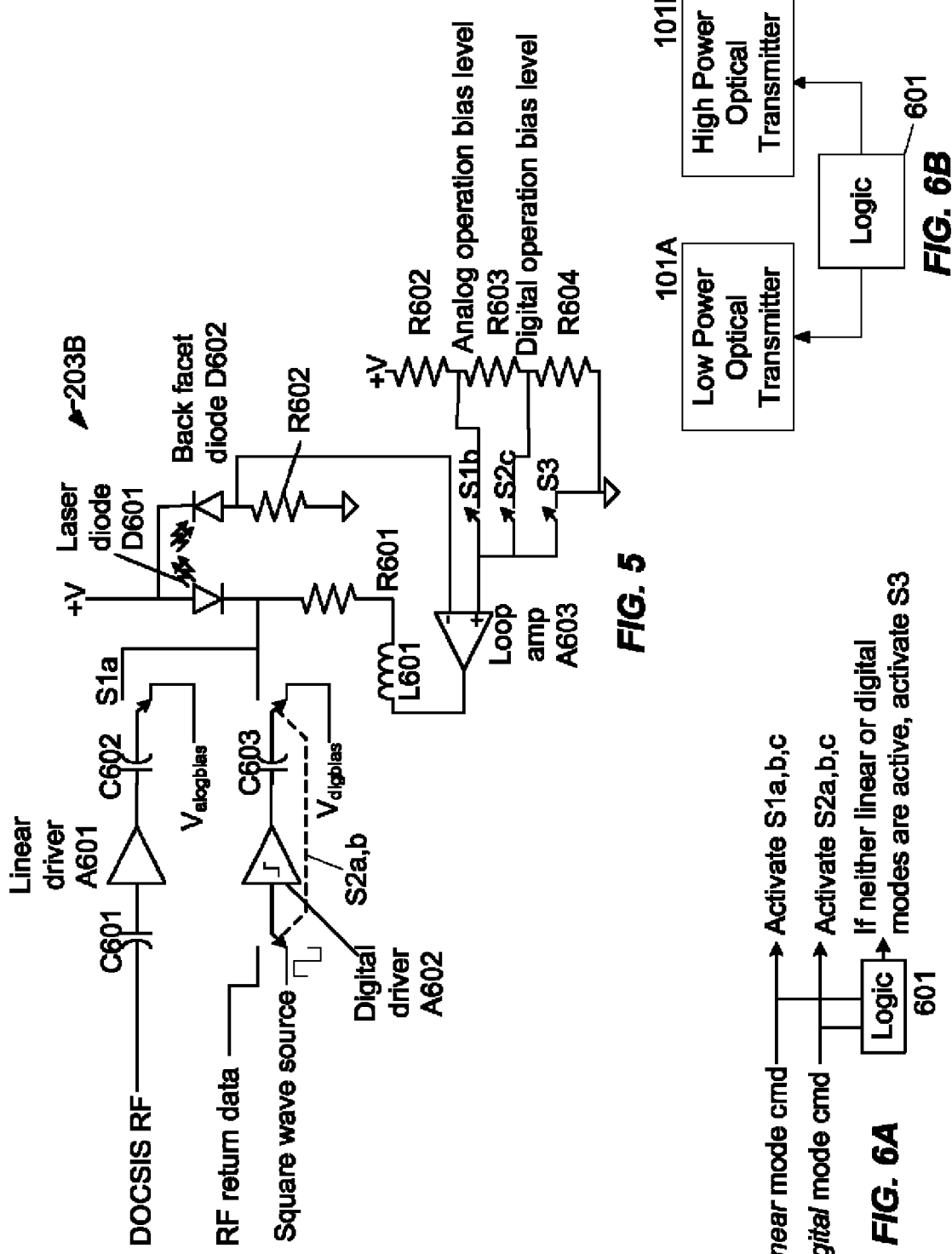

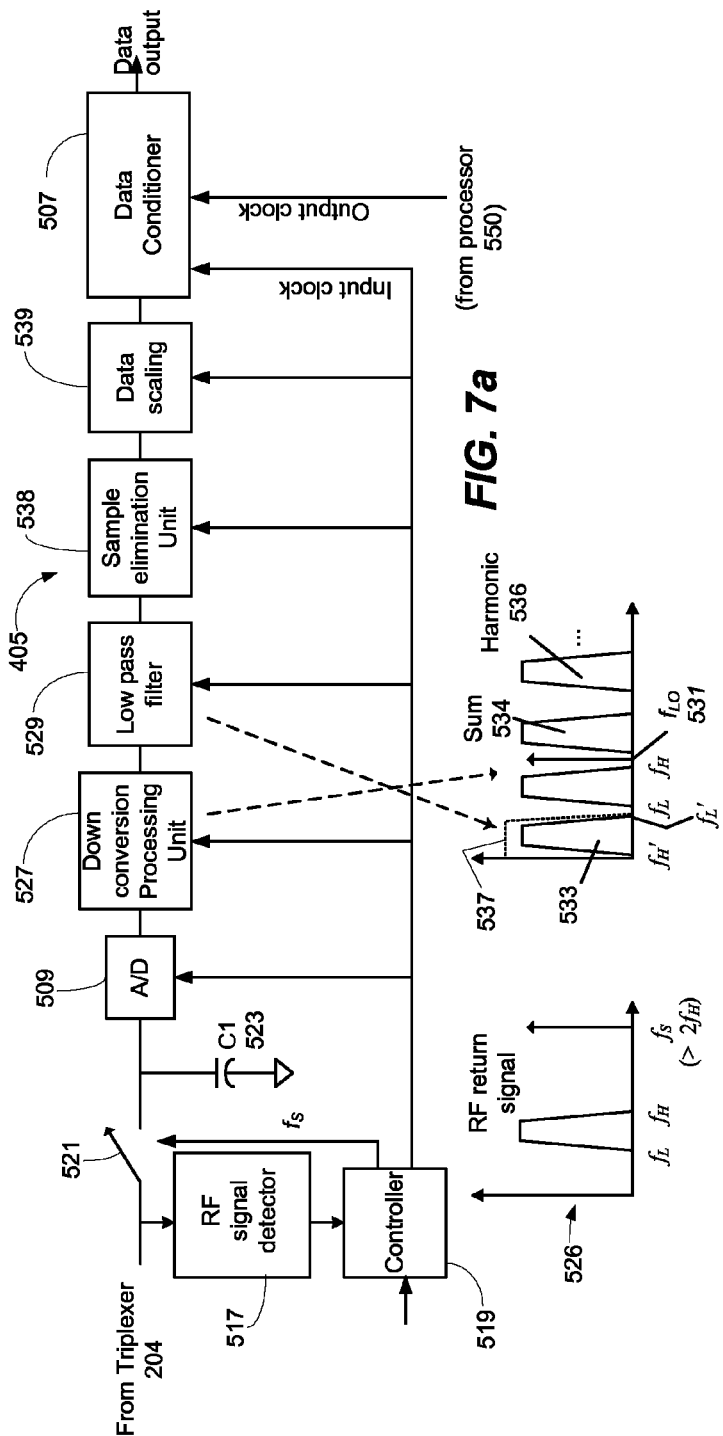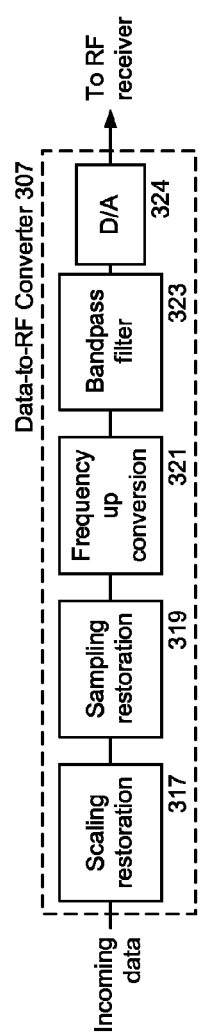

METHOD AND SYSTEM FOR PROPAGATING UPSTREAM CABLE MODEM SIGNALS AND RF RETURN VIDEO CONTROL SIGNALS OVER THE SAME OPTICAL NETWORK

STATEMENT REGARDING RELATED APPLICATIONS

The present application claims priority under 35 U.S.C. §119(e) to provisional patent application entitled, "DPON Upstream Transmission," Filed on Sep. 28, 2007 and assigned U.S. Application Ser. No. 60/995,635. The provisional patent application is hereby incorporated by reference.

TECHNICAL FIELD

The invention relates to video, voice, and data communications. More particularly, the invention relates to a fiber-to-the-home (FTTH) system that is capable of supporting upstream radio-frequency (RF) return signals formatted according to a cable modem protocol that originate from a subscriber and are sent upstream to a data service provider.

BACKGROUND OF THE INVENTION

A new proposed class of Passive Optical Networks (PONs) are under development. These particular PONs may be collectively known as DPONs, for DOCSIS PONs. DOCSIS is the acronym for Data Over Cable Service Interface Specification, commonly known as the standard for cable modems. The new developments under development address the combination of PON technology and DOCSIS technology.

PONs are becoming increasingly popular as a way to deliver video, voice, and data services to homes and businesses. Meanwhile, normal cable TV systems send RF-modulated signals part of the way to the home on fiber optic lines, and then transfer the signals to coaxial cable typically a few miles from the home.

Opposite to normal cable TV systems, PONs, which are also known as fiber-to-the-home (FTTH) systems, can use fiber optic lines all the way to the side of the home. Conventional PONs are well-known to one of ordinary skill in the art, and include systems conforming to the current Broadband PON (BPON) (ITU-T G.983) standard, Gigabit PON (GPON) (ITU-T G.984) standard, and Ethernet (PON) (EPON) (IEEE 802.3ah) standard. The first two standards were produced under the auspices of the International Telecommunications Union (ITU), while EPON was produced under the auspices of the Institute of Electrical and Electronic Engineers (IEEE). All of these standards use so-called baseband (not RF modulated) data transmission, and all have an optional overlay for downstream RF broadcast video.

One problem with all of the standard PONs is that they do not work with DOCSIS data transmission, the data standard with which the cable TV industry is most familiar and most comfortable. Cable TV systems have constructed large control networks built around DOCSIS, and they have trained thousands of engineers in DOCSIS data transmission. Because of this, many Cable TV systems are interested in a PON standard that allows them to retain all of their DOCSIS (and RF video) equipment and experience, while offering FTTH, which is being demanded in many new home developments due to it's superiority in reliability, operating cost, and performance.

Accordingly, a new type of PON, herein called a DPON, for DOCSIS PON, has been proposed and is in the process of being commercialized. Several variations of conventional DPONs exist in the market. Most conventional DPON systems have the same common physical architecture of standard PONs, such as the afore-mentioned BPON, GPON, and EPON.

Meanwhile, DOCSIS, even in it's most advanced form, when compared to BPON, GPON or EPON, the system is restricted in its ability to transmit high speed data. However, some cable operators are willing to put up with this limitation in order to continue use of the DOCSIS data transmission standard so that existing legacy equipment can be used. Such use of legacy equipment can keep operating costs for cable operators low compared to purchasing new equipment for supporting newer standards.

Referring now to FIG. 1, this Figure shows the physical architecture of a conventional DPON network, including the terminations at the head end and at the home. The conventional art referred by this disclosure does not provide a publication date to establish that it is published more one year prior to the date of the earliest claimed priority date of instant application. Further, the conventional art does not show that the subject matter was in public use or on sale in this country, more than one year prior to the earliest claimed priority date of the present application.

Moreover, "conventional art" is referred to in this writing rather than "prior art" to provide a basis of comparison for the claimed invention which is an improvement over this conventional art. Therefore, the conventional art referred to in this disclosure is not "admitted prior art" as defined under local rules certain jurisdictions.

Referring back to FIG. 1, the DPON 111 which includes the optical transmitter 101 extends from the Wave Division Multiplexer (WDM) 103 to the Optical Network Terminations or Terminals (ONTs) 105. ONTs 105 can also be referred to Optical Network Units (ONUs). The WDM 103 can join optical signals together and can split optical signals apart. The WDM 103 can function as a wavelength-sensitive multiplexer. The WDM 103 can comprise optical filtering devices such as etalons or stable solid-state single-frequency Fabry-Perot interferometers in the form of thin-film-coated optical glass.

The optical splitter 104 is a 32-way splitter, though other split ratios are possible. Physically, the DPON 111 looks about the same as a true PON (e.g., GPON or EPON). The difference is that all signals on the fiber plant are carried in RF format, which is more familiar to cable operators. The downstream signal is produced using a conventional 1550 nm RF (analog) optical transmitter 101. The downstream optical signals can contain video information which can be converted to the electrical domain by the ONT or subscriber optical interface 105 and processed by each set top box 107. Each set top box 107 can be coupled to a television 706.

For upstream transmission of RF from the home, each ONT 105 includes an optical transmitter, which is turned on only when a set top box 107 or cable modem 108 to which the ONT 105 is attached, transmits a signal. Upstream signals 109 from a set top box 107 or upstream signals 110 from a cable modem 108 are usually RF signal modulated onto either a 1310 nm optical carrier, or an optical carrier at some other wavelength, for example 1540 or 1590 nm. Each set top box 107 and each cable modem 108 of a particular house may be coupled to the same optical network terminal (ONT) 105 through an RF splitter 106. Each set top box 107 can use protocols such as the American National Standard Institute (ANSI)/Society of Cable Television Engineers (SCTE) Standard 55-1 (formerly Digital Video Subcommittee-DVS 178) SCTE 55-2, and/or DOCSIS Set-top Gateway (DSG).

The higher wavelengths for upstream signals 109, 110 are typically used to keep the conventional GPON/EPON wavelengths of 1490 nm and 1310 nm open, so that a conventional PON may be overlaid on the DPON. We shall refer to a 1310 nm upstream wavelength, understanding that the upstream optical carrier could be at some other wavelength. The systems described in the disclosure are typically not a function of which upstream wavelength is chosen.

In general, the upstream signals 109, 110 will usually comprise burst signals from two types of sources in each home: one source can include a DOCSIS cable modem 108, and the other source can include an RF return from a conventional set top box 107 using either the SCTE 55-1 or 55-2 standards, or any other type of RF return protocol. One serious problem is that there is no practical way to prevent both a DOCSIS modem 108 and a set top box 107 from transmitting at the same time (109 and 110). If one of each in different houses which are coupled to the same PON 111 try to transmit simultaneously, then two upstream transmitters 107, 108 will be on at the same time. The collision of the upstream signals 109, 110 at the optical detector 102 can cause unacceptable noise if the two optical wavelengths for the upstream signals 109, 110 are close enough.

It is noted that the condition of two set top boxes 107 or two cable modems 108 within the same house or in different houses transmitting at the same time is not considered. The set top boxes 107 and the cable modems 108 each have its own control system in the head end that will usually prevent two like devices (modems 108 or set top boxes 107) from transmitting at the same time. However, there is no practical way to tie the set top control system to the cable modem control system, such that one set top box 107 and one cable modem 108 cannot transmit at the same time. The possibility that the set top 107 and cable modem 108 in the same house will transmit at the same time is generally not a concern, because if that happens, it is likely that both will get through.

In addition to the problem of potential collision of upstream signals originating from separate houses, another potential problem of conventional systems is the need to support DOCSIS 3.0, which may have four RF channels of complex modulation. This requires a relatively high degree of linearity in the optical transmitter, and requires relatively high optical power to transmit the upstream signal. The SCTE 55-1 and -2 RF Return signals are QPSK modulation at lower bandwidth, and hence do not require as much optical power to transmit them to the head end.

Accordingly, there is a need in the art for a method and system for supporting DOCSIS over a PON. Particularly, there is a need in the art for reducing or eliminating the possibility of upstream return signals originating from a set top box 107 of first subscriber's premises from colliding and reducing reception of cable modem return signals originating from a cable modem 108 from a second subscriber's premises. There is a further need in the art for more robust optical transmitters 101 to support DOCSIS signals which may employ several RF channels of complex modulation.

SUMMARY OF THE INVENTION

A method and system can propagate upstream cable modem signals and radio-frequency (RF) return video control signals over the same passive optical network (PON). The method and system can include various combinations of hardware and software to support this operation.

According to one exemplary combination, the method and system can include a set top box and cable modem which are coupled to an optical network terminal (ONT). The ONT can include a dual mode, analog optical transmitter for propagating signals from both the set top box and the cable modem upstream to a head end. The dual mode of the optical transmitter can include a first power mode which is relatively higher than a second power mode. The first higher power mode can support upstream cable modem signals. The term "upstream" can define a communication direction where a subscriber originates a data signal that is sent upwards towards a head end of an optical network. Conversely, the term "downstream" can define a communication direction where the head end originates a data signal that is sent downwards towards subscribers of an optical network.

The second lower power mode of the analog optical transmitter can support upstream radio-frequency (RF) return signals originating from the set top box. If the optical RF return signals collide with the optical cable modem signals, the optical RF return signals can be generally be ignored by an optical receiver in the head end since the optical cable modem signals have a higher power relative to the lower power optical RF return signals. This level difference between the optical signals can be addressed, if desired, with an amplification stage in the head end which can amplify the converted RF return signals by twice the difference in optical powers designed into each optical network terminal. In other words, the amplification stage in the head end is not necessary and is optional.

According to another exemplary combination, the method and system can include a set top box coupled to an optical network terminal (ONT). The ONT can include a cable modem and digital return equipment which can convert upstream analog radio frequency RF return signals into upstream packets. These RF return packets can be fed into the cable modem which is positioned within the ONT. The cable modem within the ONT can also receive other signals such as from a phone or a personal computer (or both). The cable modem can modulate an analog optical transmitter for propagating the RF return packets and data and/or voice signals upstream. The analog optical transmitter can be a single mode transmitter. In the head end, the cable modem termination system (CMTS) can process the upstream cable modem signals. The CMTS can route the upstream RF return packets to an appropriate data-to-RF converter where the RF return packets are transformed into the original analog RF return signals.

According to another exemplary combination, the method and system can include a set top box and a cable modem coupled to an optical network terminal (ONT). The ONT can include digital return equipment which can convert upstream analog radio frequency RF return signals into upstream packets. These upstream RF return packets can be fed into a buffer and control device. The ONT can further include a dual-mode optical transmitter that is coupled to an RF detector. When the RF detector senses cable modem signals, the RF detector can activate a high power linear or analog mode of the optical transmitter and prevents any RF return packets from being converted into the optical domain.

In the absence of upstream cable modem signals, the upstream RF return signals can be converted into the optical domain with the optical transmitter operating in a low power digital mode. In the head end, the cable modem termination system (CMTS) can process the upstream cable modem data signals. The RF return packets can be fed to an appropriate data-to-RF converter where the RF return packets are transformed into the original analog RF return signals.

According to another exemplary aspect, an improved dual mode optical transmitter can include pre-charging capacitors which enables the optical transmitter to be initialized and stabilized faster relative to conventional transmitters. As noted previously, for one of the exemplary embodiments of the system discussed above, the optical transmitter can support at least two unique modes: (1) a first mode low-powered digital transmitter mode and (2) a second higher-powered analog transmitter mode. For two of the other exemplary embodiments of the system, the optical transmitter can support at least two analog modes: (1) a high power analog mode; and (2) a low power analog mode.

BRIEF DESCRIPTION OF THE EXEMPLARY EMBODIMENTS

FIG. 2A illustrates a high-level functional block diagram of a DOCSIS Passive Optical Network (DPON) system in which an analog optical transmitter has two analog modes of operation according to one exemplary embodiment of the invention.

FIG. 3A illustrates a high-level functional block diagram of a DOCSIS Passive Optical Network (DPON) system in which analog RF Return signals from legacy set top boxes are digitized and inputted into a cable modem according to one exemplary embodiment of the invention.

Figure 4B:
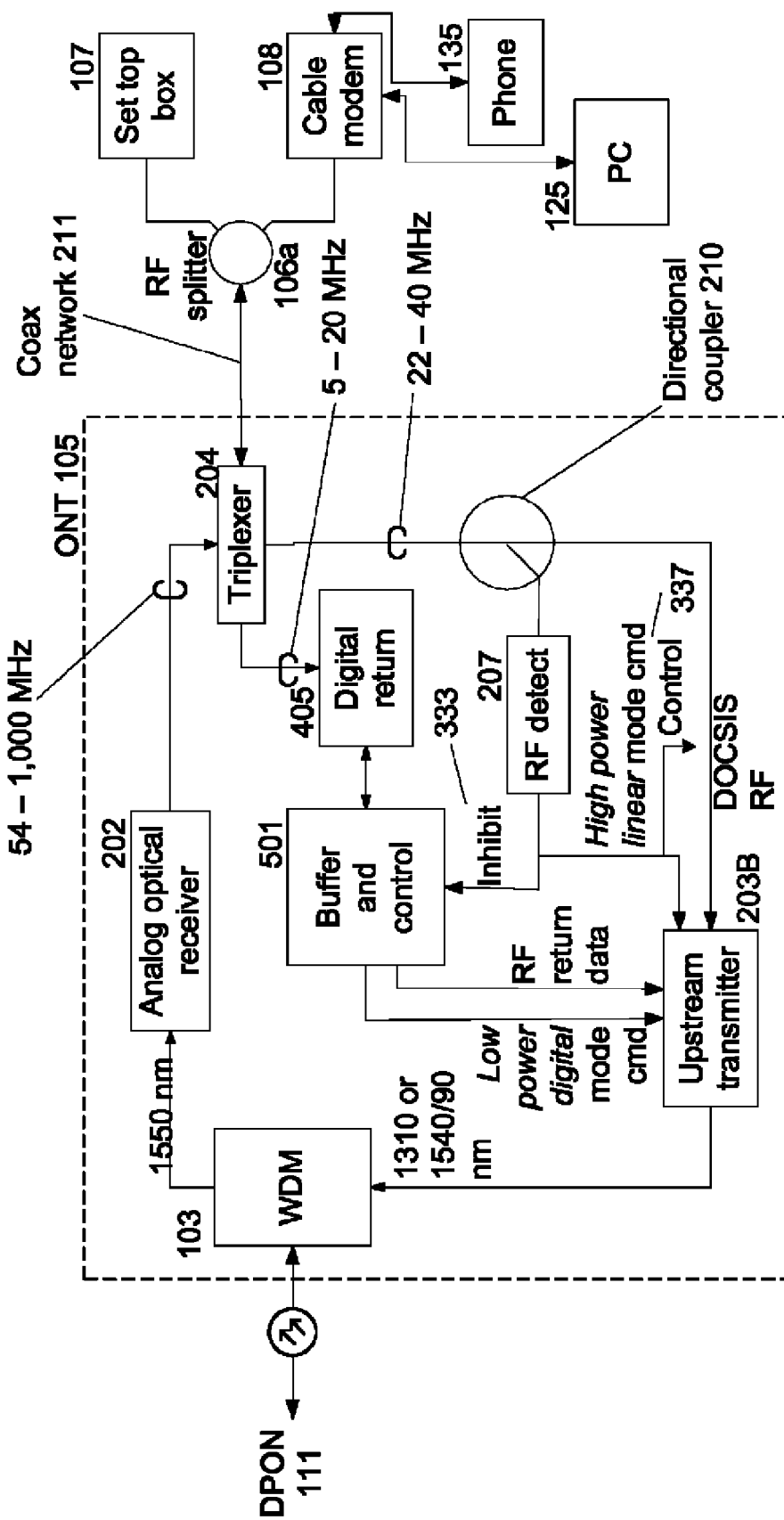
FIG. 4A illustrates a high-level functional block diagram of a DOCSIS Passive Optical Network (DPON) system in which analog RF Return signals from legacy set top boxes are digitized and modulate a dual mode optical transmitter having a first low power digital mode and a second high power analog mode according to one exemplary embodiment of the invention.

FIG. 4B illustrates a detailed functional block diagram of an optical network terminal (ONT) for the DOCSIS Passive Optical Network (DPON) system of FIG. 4A in which analog RF Return signals from legacy set top boxes are digitized and modulate a dual mode optical transmitter having a first low power digital mode and a second high power analog mode according to one exemplary embodiment of the invention.

Figure 4C:
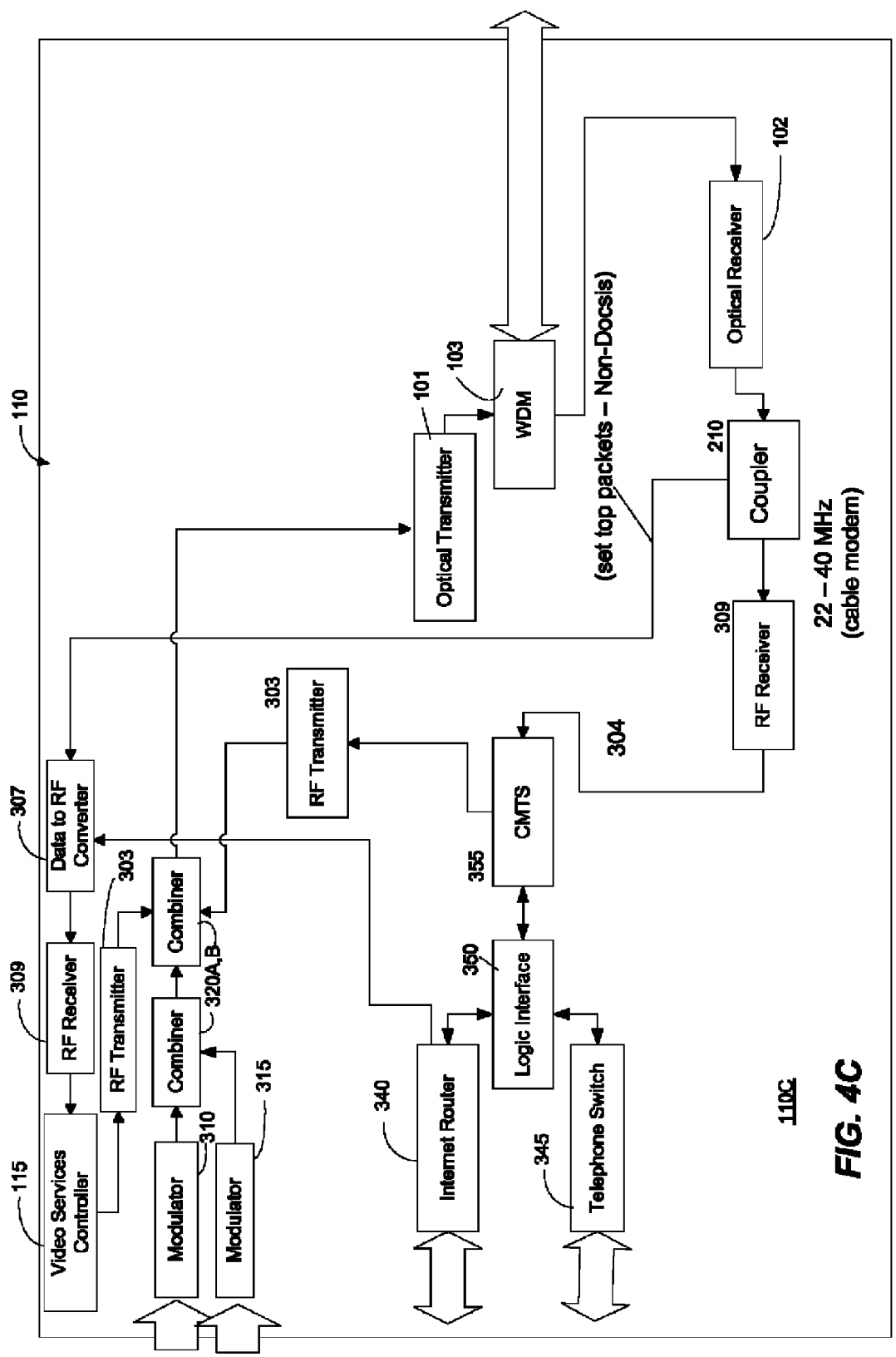

FIG. 4C illustrates a detailed functional block diagram of a head end unit for the DOCSIS Passive Optical Network (DPON) system of FIG. 4A in which analog RF Return signals from legacy set top boxes are digitized in the optical network terminal and modulate a dual mode optical transmitter having a first low power digital mode and a second high power analog mode according to one exemplary embodiment of the invention.

FIG. 5 illustrates a detailed functional block diagram for a dual mode optical transmitter according to one exemplary embodiment of the invention.

FIG. 6A illustrates a detailed functional block diagram for logic that provides the low power digital mode and high power linear, analog mode for an optical transmitter according to one exemplary embodiment of the invention.

FIG. 6B illustrates a functional block diagram having logic that controls a low power optical transmitter and a high power optical transmitter according to one exemplary embodiment of the invention.

FIG. 7a is a functional block diagram illustrating some core components of a digital return equipment according to one exemplary embodiment of the invention.

FIG. 7b is a graph illustrating an exemplary Nyquist sampling spectrum of an RF return signal according to one exemplary embodiment of the invention.

FIG. 7c is a graph illustrating an exemplary digitized RF signal that is multiplied by a number representing a sinusoidal waveform.

FIG. 8 is an exemplary functional block diagram that describes further details of a data-to-RF converter according to one exemplary embodiment of the invention.

Figure 9:
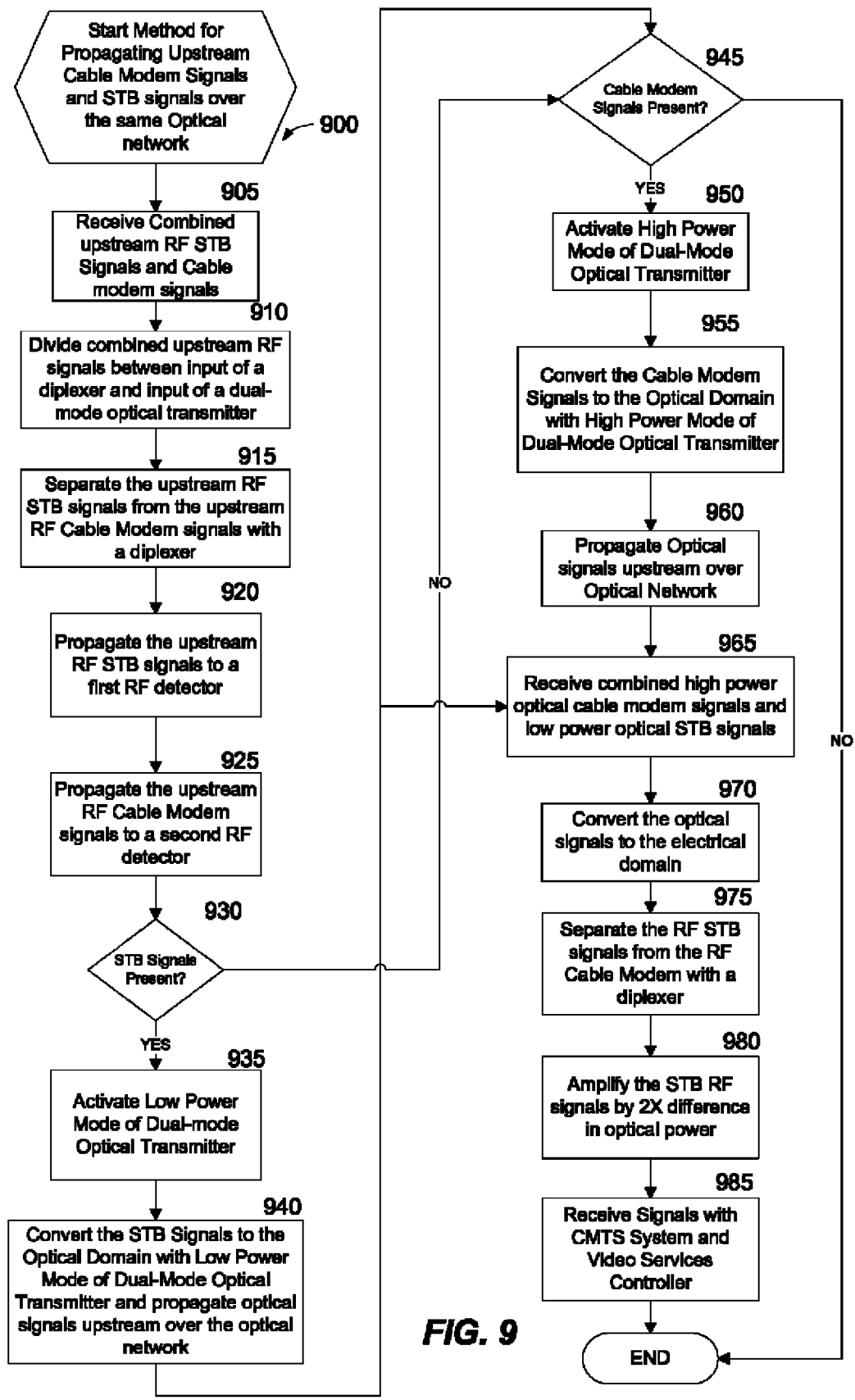

FIG. 9 is a logic flow diagram illustrating exemplary steps for propagating upstream cable modem signals and RF Return STB signals that correspond to the system of FIG. 2A according to one exemplary embodiment of the invention.

Figure 10:
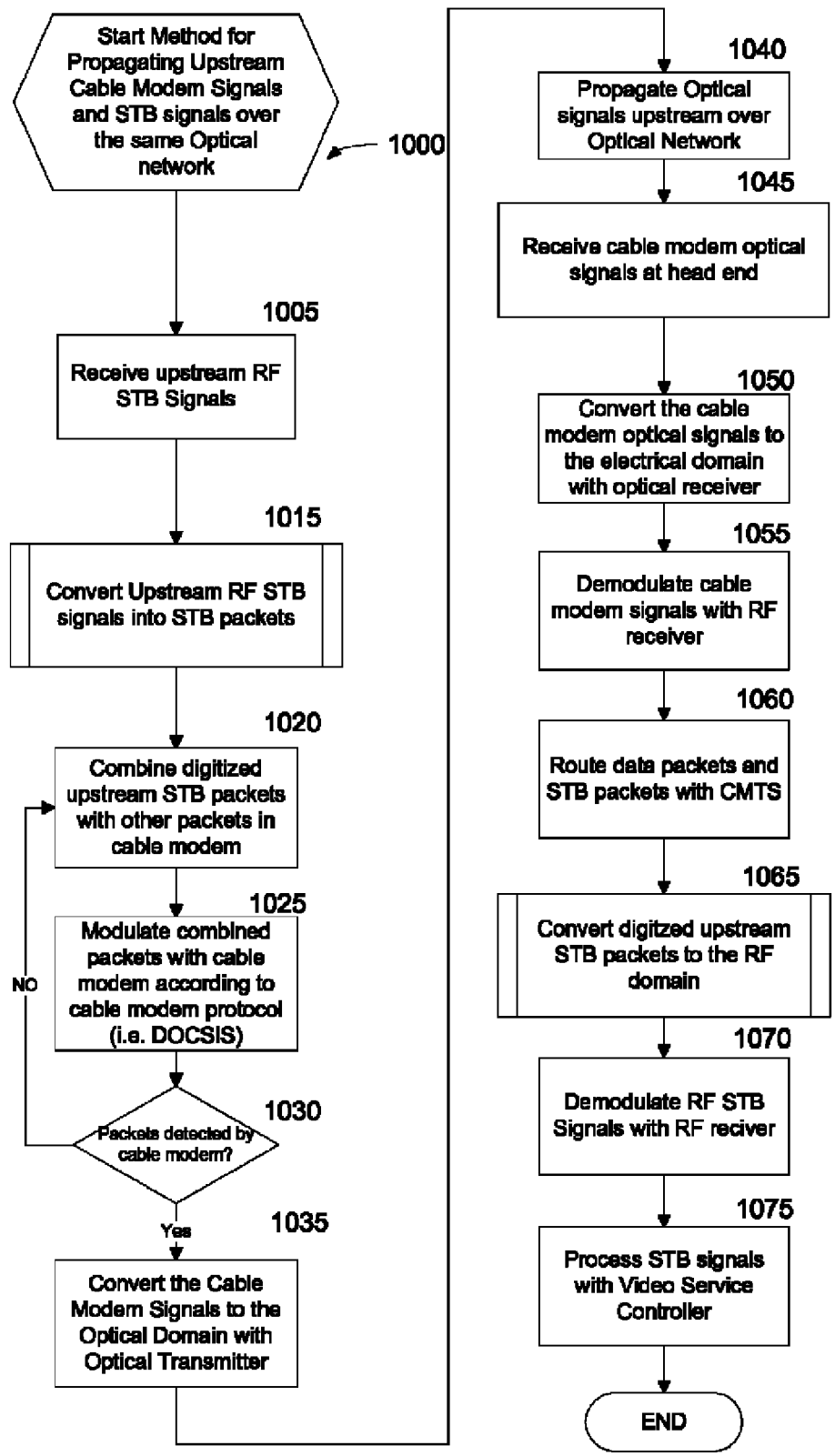

FIG. 10 is a logic flow diagram illustrating exemplary steps for propagating upstream cable modem signals and RF Return STB signals that correspond to the system of FIG. 3A according to one exemplary embodiment of the invention.

Figure 11:
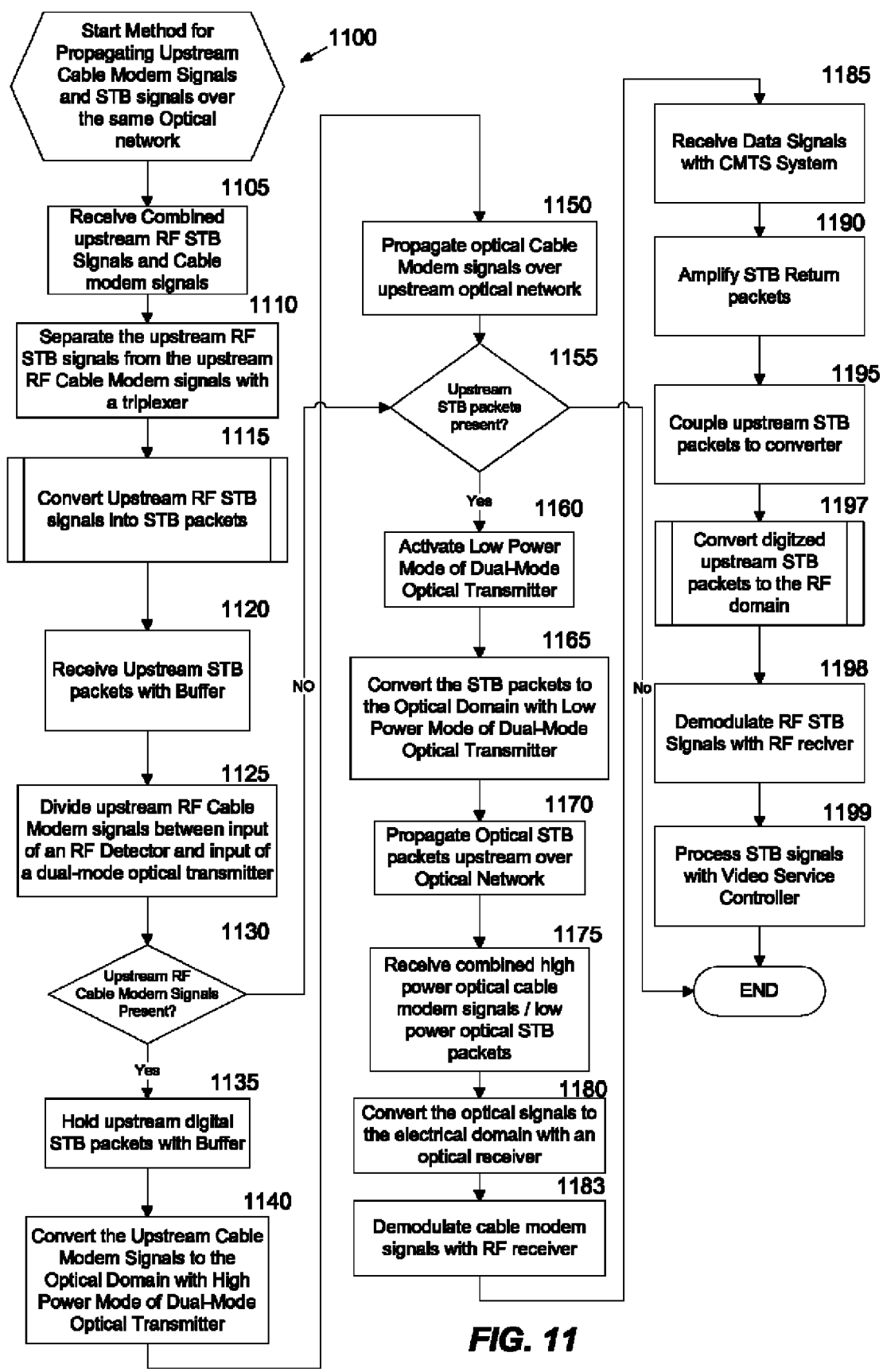

FIG. 11 is a logic flow diagram illustrating exemplary steps for propagating upstream cable modem signals and RF Return STB signals that correspond to the system of FIG. 4A according to one exemplary embodiment of the invention.

Figures 12, 13:
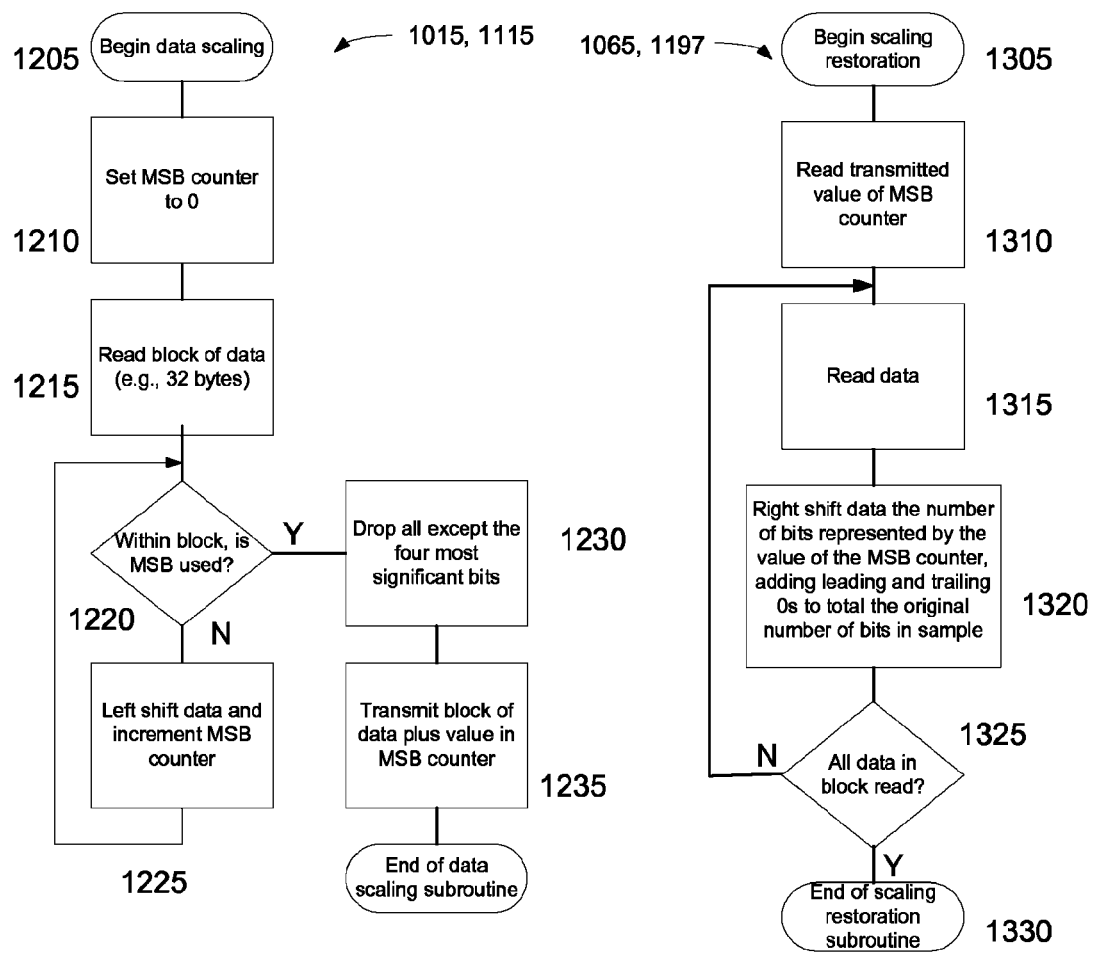

FIG. 12 is a logic flow diagram illustrating an exemplary method for scaling data received from a video service terminal or set top box that can be performed by a data scaling unit illustrated in FIG. 7a according to one exemplary embodiment of the invention.

FIG. 13 illustrates an exemplary scaling restoration process according to one exemplary embodiment of the invention.

DETAILED DESCRIPTION OF EXEMPLARY EMBODIMENTS

Three exemplary embodiments of an ONT 105 of a DPON system 100 are described and which improve performance of the system 100 by ensuring that, in the event the upstream transmitters of two ONTs 105 are turned on simultaneously, the more critical communication transmission will "win" over the less critical communication transmission. The system 100 is designed such that transmission which is received and processed out of two competing transmissions originating from a set top box 107 and a cable modem 108, will be the one originating from the cable modem, which can be using the DOCSIS cable modem protocol. The system is designed with the assumption that cable modem originated signals may be carrying voice communications which cannot can be delayed or repeated. On the other hand, set top box signals can be repeated if they do not get through to the head end, with generally no deleterious effect.

Turning now to the drawings, in which like reference numerals refer to like elements, FIG. 2A illustrates a high-level functional block diagram of a DOCSIS Passive Optical Network (DPON) system 100A in which an analog upstream optical transmitter 203A has two analog modes of operation according to one exemplary embodiment of the invention. The analog optical transmitter 203A can be housed within the optical network terminal (ONT 105). The ONT 105 can be coupled to a set top box (STB) or video services terminal 107.

The ONT 105 may also be coupled to a cable modem 108. The cable modem 108 can propagate signals using a cable modem protocol, such as the DATA-OVER-CABLE-SERVICE-INTERFACE-SPECIFICATION (DOCSIS). It is understood that the cable modem 108 can be a stand alone cable modem or a device that is embedded with a cable modem 108. It is also understood that the instant teaching also applies to the form of DOCSIS used in Europe and elsewhere, known as Euro DOCSIS and including other similar systems. It is also noted that the video service terminal or set top box 107 can be of the cable modem (C/M) type that also uses a cable modem protocol, such as DOCSIS.

The cable modem 108 can be coupled to a personal computer 125 and a telephone 135. The cable modem can be coupled to the personal computer 125 with conventional category 5 wiring. In other words, the cable modem 108 can support connections to peripheral devices like personal computers 125 with Ethernet ports. The cable modem 108 can support analog or digital telephones 135.

As noted above, the ONT 105 can include a dual-mode analog optical transmitter 203A for propagating signals from both the set top box 107 and the cable modem 108. The dual-mode of the optical transmitter 203A can include a first power mode which is relatively higher than a second power mode. The first power mode can support upstream cable modem signals that originate from the cable modem 108. The second lower power mode of the analog optical transmitter 203A can support upstream radio frequency (RF) analog return signals that originate from the set top box 107. The dual-mode optical transmitter 203A propagates the optical signals through optical wave guides 150 and other portions of an optical network 111, which can include additional optical splitters 104 (See FIG. 1).

When the optical signals are received in the head end 110, the optical RF return signals which have a lower power relative to the optical cable modem's signal from the cable modem 108 can be ignored by equipment in the head end 110 since the cable modem signals from the cable modem 108 will have a higher power relative to the lower power optical RF return signals from the set top box 107. This level difference between the optical signals originating from the video services terminal or set top box 107 and the cable modem 108 can be addressed, if desired, with an amplification stage (amplifier 212) which can amplify the RF return signals by twice the difference in the optical powers provided by the dual-mode optical transmitter 203 and the ONT 105. As noted previously, this amplification stage is optional and is not required. The system can function normally without this stage.

The amplified analog RF return electrical signals can be fed into a receiver which then feeds the signals to a video services controller 115. Similarly, the cable modem signals which have been converted into the electrical domain can be fed into a cable modem termination system 355.

The cable modem termination system (CMTS) 355. The CMTS 355 is typically designed to transmit and receive digital radio-frequency (RF) signals. The CMTS 111 can comprise conventional hardware that can support data services such as Internet based communications. However, the CMTS 111 is not limited to the aforementioned applications and can include other applications that are not beyond the scope and spirit of the invention.

In some exemplary embodiments, the CMTS 355 in the head end can be split between two locations. For example, a portion, primarily a data switch (not illustrated), can be located in a first head end 110 that services a plurality of second head ends 110, while an RF transmitter plus one or more receivers can be located in each second head end 110. The first and plurality of second head ends 110 can be linked using any of several known communications paths and protocols.

The cable modem 108 can receive control signals from the CMTS 355 and can transmit RF-modulated return digital signals back to the CMTS 111. The RF-modulated return digital return cable modem signals may comprise data signals or voice signals. The CMTS 355 can also send control signals to each cable modem 108. The control signals from the CMTS 355 can prevent upstream return collisions between respective cable modems 108 by controlling the timing of when cable modems 108 are able to transmit in the upstream direction.

The legacy video services controller 115 can support incidental communications related to video services. For example, a video service terminal or set top box 107 may use RF return communications to send information to the video service controller 115 concerning what impulse-pay-per-view (IPPV), pay-per-view (PPV), and video-on-demand (VOD) programs have been watched, and/or what VOD program is desired. The legacy video services controller 115 is typically designed to transmit and receive digital radio-frequency (RF) signals. The legacy video services controller 115 can comprise conventional hardware that supports services such as PPV and VOD services. However, the video services controller 115 is not limited to the aforementioned applications and can include other applications that are not beyond the scope and spirit of the present invention.

In some exemplary embodiments, the video services controller 115 can be split between two locations. For example, a portion, primarily a computer, can be located in a first head end 110 that services a plurality of second head ends 110, while an RF transmitter plus one or more receivers can be located in each second head end 110. The first and plurality of second data head ends 110 can be linked using any of several known communications paths and protocols.

The video services controller 115 can support communications with legacy set top boxes 107 that use either a query-response protocol or a contention protocol. In other words, the set top boxes 107 may use upstream RF return communications in which the timing of upstream RF return signals to the video service controller 115 is not critical, such as in the Digital Video Services (DVS) Standard 178 or SCTE 55-1 standard.

In the query-response protocol, the video services controller 115 communicates with a particular set top box 107 and waits for a response from the set top box 107. In the contention protocol, a set top box 107 wanting to send data to the video service controller 115 contends with all set top boxes 107 for the right to send its information. When a set top box's communication is successful, the video service controller 115 acknowledges the set top terminal's request and the set top terminal 107 can then transmit its information to the data service hub. This type of protocol is often referred to as the aloha protocol.

With either a contention protocol or query-response protocol, the set top box 107 can receive control signals from the video service controller 111 and can transmit RF-modulated return analog signals back to controller 115. The control signals based on either the contention protocol or query-response protocol from the video service controller 111 can prevent RF return collisions between respective set top boxes 115 by controlling the timing of when set top boxes 107 are able to transmit in the upstream direction. The RF-modulated return analog signals may comprise broadcast video selection options selected by a subscriber. Most legacy set top boxes 107 as of the writing of this description can produce digital signals that are modulated onto an analog RF carrier. Thus, the system 100 can support anyone or more set top box (STB) RF return standard protocols, such as, but not limited to, DVS 178, SCTE 55-1, SCTE 55-2, or DSG RF Return standard protocols.

As noted above, the set top box 107 can permit a subscriber to transmit data and/or to select options that are part of various exemplary video services such as impulse-pay-per-view and video-on-demand. However, the video services controller 115 is not limited to the aforementioned applications and can include numerous other applications where RF analog signals are used to carry information back to the head end 110.

Referring now to FIG. 3A, this figure illustrates a high level functional block diagram of a DOCSIS passive optical network (DPON) system 100B in which RF return signals from legacy set top boxes 107 are digitized and inputted into a cable modem 108 according to one exemplary embodiment of the invention. The set top box 107 of this exemplary embodiment illustrated in FIG. 3A can be coupled to an optical network terminal (ONT) 105. The ONT 105 can include a cable modem 108 as well as digital return equipment 405 which can convert upstream analog radio frequency RF return signals from the set top box 107 into upstream packets.

These RF return packets can be fed into a cable modem 108 which is housed or contained within the optical network terminal 105. The cable modem within the ONT 105 can also receive other signals such as from a phone 135 and a personal computer 125. The cable modem 108 within the ONT 105 can modulate an analog optical transmitter for propagating the RF return packets and the data and/or voice signals in an upstream direction toward the head end 110. The analog optical transmitter (not illustrated) can be a conventional single mode optical transmitter 101 (compared to the dual-mode optical transmitters 203A, 203B described below). The optical transmitter 101 can comprise one of fabry-perot (F-P) laser transmitters, distributed feedback lasers (DFBs), or vertical cavity surface emitting lasers (VCSELs). However, other types of optical transmitters 101 are possible and not beyond the scope of the present invention.

In the head end, the cable modem termination system (CMTS) 355 can process the upstream cable modem signals. The cable modem termination system 355 can route the upstream RF return packets to an appropriate data to RF converter 307 where the RF return packets are transformed into their original analog RF return signals. These RF return signals can then be fed into the video services controller 115. Further details of the ONT 105 and the head end 110 of the exemplary embodiment illustrated in FIG. 3A will be discussed below in connection with FIG. 3B and FIG. 3C.

Referring now to FIG. 4A, this figure illustrates a high level functional block diagram of a DOCSIS passive optical network (DPON) system 100C in which analog RF return signals from Legacy set to boxes 107 are digitized and are used to modulate a dual-mode optical transmitter 203B having a first low power digital mode and a second high power analog mode according to one exemplary embodiment of the invention. The set top box 107 and cable modem 108 can be coupled to the optical network terminal (ONT) 105. The ONT 105 can include digital return equipment 405 similar to that of FIG. 3A, which can convert upstream analog radio frequency RF return signals from the set top box 107 into upstream packets. These RF return packets can be fed into a buffer and control device 501. Further details of this buffer and control device 501 will be described in further detail below in connection with FIG. 3B.

The ONT 105 can further include a dual-mode optical transmitter 203B that is coupled to an RF detector (not illustrated). Further details of the dual-mode optical transmitter 203B and the RF detector (not shown) will be described and illustrated below in connection with FIG. 3B.

When the RF detector senses cable modem signals, the RF detector can activate a high power linear or analog mode of the optical transmitter 203B and can prevent any RF return packets stored within the buffer and control device 501 from being converted into the optical domain. In the absence of upstream cable modem signals, the upstream RF return signals stored within the buffer and control device 501 can be converted into the optical domain with the optical transmitter 203B operating in a low power digital mode.

In the head end 110, the cable modem termination systems 355 can process the upstream cable modem data signals. The RF return packets can be fed to an appropriate data to RF converter 307 where the RF return packets are transformed into the original analog RF return signals for processing by the video services controller 115. Further details of the equipment in the head end 110 of this exemplary embodiment are discussed in further detail below, with respect to FIG. 4C.

Figure 2B:
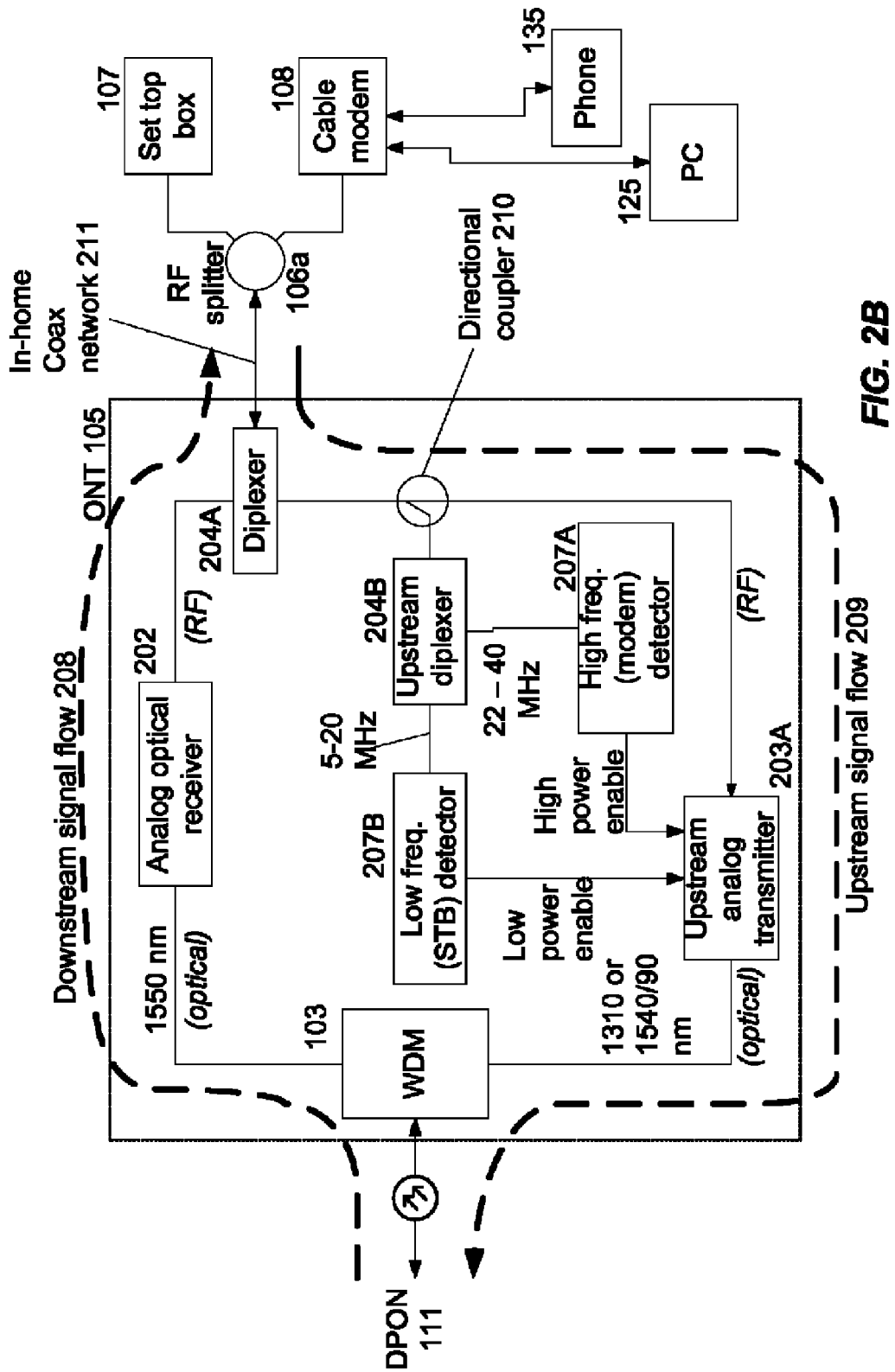
FIG. 2B illustrates a detailed functional block diagram of an optical network terminal (ONT) for the DOCSIS Passive Optical Network (DPON) system of FIG. 2A in which an analog optical transmitter has two analog modes of operation according to one exemplary embodiment of the invention.

Referring now to FIG. 2B, this Figure illustrates a detailed functional block diagram of an optical network terminal (ONT) 105 for the DOCSIS Passive Optical Network (DPON) system 100 of FIG. 2A in which an analog optical transmitter 203A has two analog modes of operation according to the exemplary embodiment of the invention.

An overview of this exemplary embodiment is that the system 100 provides intelligent power level control with respect to upstream transmissions of RF Return STB signals and cable modem signals. This intelligent level control of FIG. 2B can preserve the all-RF analog nature of the return, with a low-cost optical network terminal (ONT) 105 at the home or subscriber's premises. With this exemplary embodiment, if there is an upstream signal collision between a DOCSIS modem 108 from a first subscriber's premises, such as house, and a set top box 107 in another subscriber's premises, the upstream signals from the modem 108 should be the winner or only signal monitored at the end of the collision. This dominance by the signals from the cable modem 108 may be important, since the modem 108 may be carrying high-priority voice traffic relative to the video service control information contained in the RF Return signals from the set top box 107.

With the exemplary embodiment illustrated in FIG. 2B, the set top protocols are such that a failed retransmission will be repeated, with little or no notice by the subscriber. One of the objectives in this exemplary embodiment is to transmit the DOCSIS cable modem signals at a higher optical level than set top signals are transmitted. Whether a transmission originates at a DOCSIS cable modem 108 or a set top box 107 can be determined at the ONT 105 because set top boxes 107 typically use lower frequency RF returns than most DOCSIS cable modems 108.

The ONT 105 of FIG. 2B has optical level control with respect to the upstream analog optical transmitter 203A. The ONT 105 can be coupled to the set top box 107 and cable modem 108 with an in-home coaxial cable network 211. The coaxial cable network 211 may have radio frequency (RF) splitters 106a that are coupled to the set top box 107 and a cable modem 108. The cable modem 108 can be coupled to a personal computer (PC) 125 and an analog phone 135.

Upstream DOCSIS cable modem signals from the cable modem 108 are sent upstream over the coaxial cable network 211 through the RF splitter 106a to an RF diplexer 204A. The RF diplexer 204A is a frequency sensitive device. Typically, it comprises filters which can separate signals according to the frequency bands of the filters contained within the device.

The in-home Coax network 211, can couple high frequency downstream signals 208 from the analog optical receiver 202 of the ONT 105 through the RF diplexer 204A to the set top box 107. The optical signals containing the high frequency downstream signals prior to the optical receiver 202 can be initially received by the ONT 105 with a wavelength division multiplexer 103. The wavelength division multiplexer (WDM) 103 can manage both upstream and downstream optical signals for the ONT 105. The high frequency downstream signals exiting the optical receiver in the electrical domain can have a frequency range of about 54 to 1,000 MHz. However, other frequency ranges for the downstream signals are not beyond the scope of the invention.

Meanwhile, RF return analog upstream signals from the set top box 107 are coupled to the lower frequency port of diplexer 204A. The RF return analog upstream signals usually have a frequency range of about under 42 MHz in North America. However, other frequency ranges for the upstream RF return analog signals from the set top box 107 are not beyond the scope of the invention.

A directional coupler 210 can sample the upstream signals, which include both the RF Return analog signals and the cable modem signals, to route the sample through a second upstream RF diplexer 204B to a low radio frequency (STB) detector 207B and a high radio frequency (DOCSIS modem) detector 207A. The two detectors 207A, 207B each detect RF power in their respective frequency bands. The exemplary frequency bands for the RF Return analog signals from the set top box 107 can be in a range of about 5 to about 20 MHz and about 22 to about 40 MHz for the cable modem 108.

If a modem (DOCSIS) signal is detected by the high radio frequency detector 207A, the upstream analog optical transmitter 203A is turned on in a high powered mode via a high power enable signal from the high frequency (modem) detector 207A. If a low radio frequency signal from a set top is detected, the upstream optical transmitter 203 is biased to a lower power point via the low power enable signal from the low radio frequency (STB) detector 207B. Thus, if a cable modem 108 in first subscriber premises and a set top box 107 in another subscriber premises turn on at the same time, the optical level from the cable modem 108 will be higher, and any interference from the RF Return analog signals from the set top box 107 are minimal and can be ignored. The RF return analog optical signal derived from the set top box 107 will not produce significant interference with the DOCSIS return signal derived from the cable modem 108 because the set top box signals are converted into the optical domain with significantly lower optical power.

The high power mode for the optical transmitter 203 will generally be on the order of about one milliwatt. The lower power mode for the optical transmitter 203 will be on the order of about one-half or about one-tenth of the high power mode, so the low power mode will be about a half milliwatt or a tenth of a milliwatt. However, other magnitudes higher or lower than disclosed for the two power modes are not beyond the scope of the invention.

The wavelength of the optical signals exiting the analog optical transmitter 203A can be one of about 1310 nanometers, about 1540 nanometers, or about 1590 nanometers. Other optical wavelengths below or above those disclosed are not beyond the scope of the invention.

One of ordinary skill in the art recognizes that this power level difference at the head end 110 may require that the gain from each ONT 105 received by the head end 110 to be substantially the same for each ONT 105. This condition is generally satisfied with some allowance for different coupling from different ports on each optical splitter 104 of FIG. 1. Allowances can also be made different length fiber runs to different ONTs 105, and different connection losses. These factors are all known to one of ordinary skill in the art.

Figure 2C:
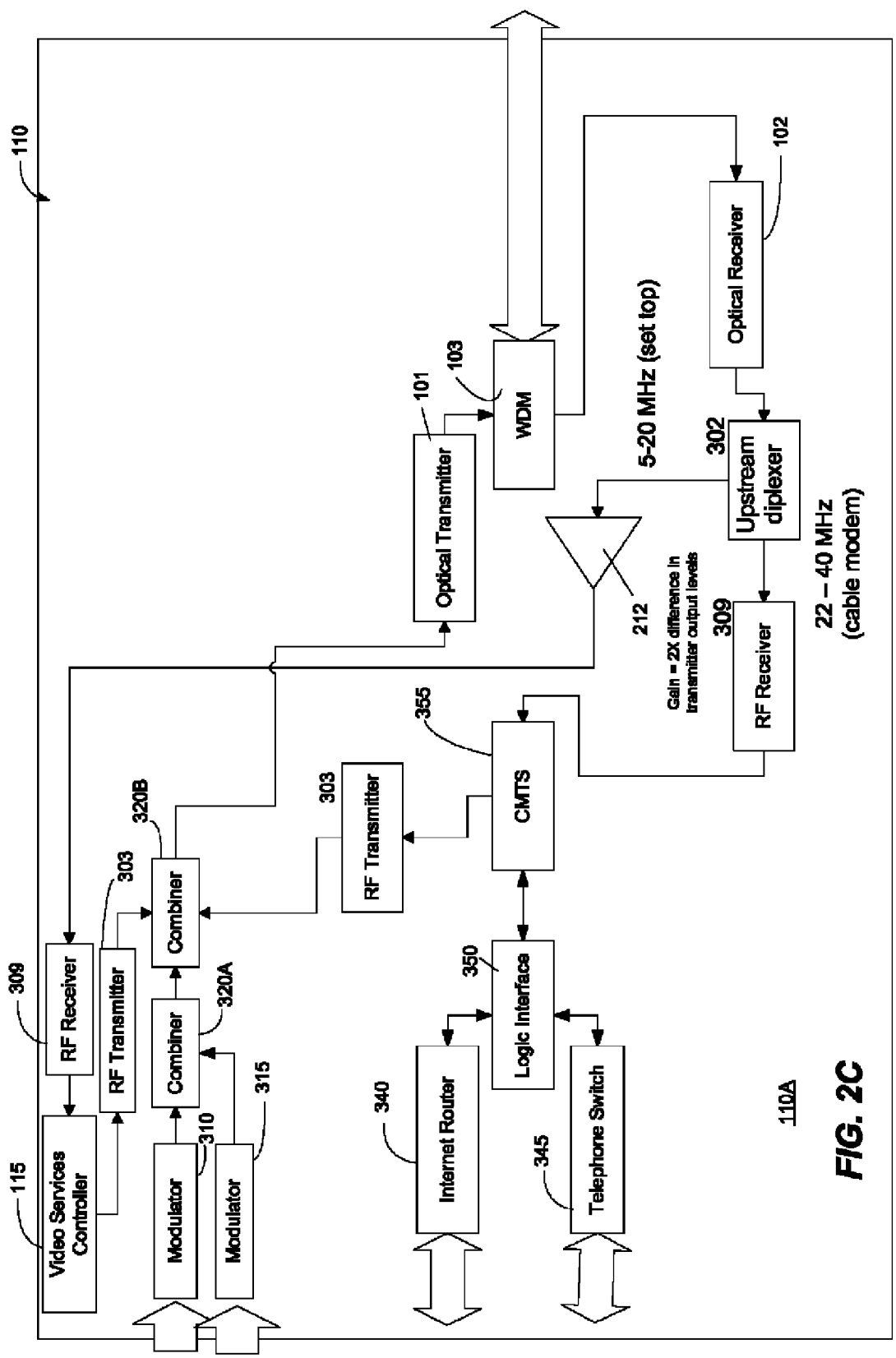
FIG. 2C illustrates a detailed functional block diagram of a head end unit for the DOCSIS Passive Optical Network (DPON) system of FIG. 2A in which an analog optical transmitter of the optical network terminal (ONT) has two analog modes of operation according to one exemplary embodiment of the invention.

Referring now to FIG. 2C, this figure illustrates a detailed functional block diagram of a head end 110 for the DOCSIS passive optical network (DPON) system of FIG. 2A, in which an analog optical transmitter 203A has two analog modes of operation according to one exemplary embodiment of the invention. The head end 110 can comprise one or more modulators 310, 315 that are designed to support television broadcast services. The one or more modulators 310, 315 can be analog or digital-type modulators. In one exemplary embodiment, there can be at least 78 modulators present in the head end 110. Those skilled in the art will appreciate that the number of modulators 310, 315 can be varied without departing from the scope and spirit of the present invention.

The signals from the modulators 310, 315 can be combined in the first combiner 320. The control signals from the video services controller 115 are modulated on an RF carrier by an RF transmitter 303. The RF transmitter 303 feeds its downstream analog RF electrical signals into a second combiner 320B with the combined electrical signals from the two modulators 310, 315. The combined video service controller signals and broadcast video signals are supplied to an optical transmitter 101 where these signals are converted into optical form and sent out through the wavelength division multiplexer 103.

One of ordinary skill in the art recognizes that the number of variations of the signal flow within the head end 110 as well as within other devices such as the ONT 105 are possible without departing from the scope and spirit of the present invention. For example, in this head end 110, the two combiners 320A and 320B may actually be one in the same combiner. Also, video signals may be generated as another head end 110 and sent to the head end 110 by using any of a plurality of different transmission methods known to one of ordinary skill in the art. For example, some portion of the video signals may be generated and converted to optical form at a remote first data service hub or head end 110. A second head end 110, then may be combined with other signals generated locally.

The optical transmitter 101 can comprise one of fabry-perot (F-P) laser transmitters, distributed feedback lasers (DFBs), or vertical cavity surface emitting lasers (VCSELs). However, other types of optical transmitters 101 are possible and not beyond the scope of the present invention. With the aforementioned optical transmitters 101, the head end 110 lends itself to efficient upgrading by using off-the-shelf hardware to generate optical signals.

The head end 110 can further comprise an Internet router 340. The data service hub 110 can further comprise a telephone switch 345 and supports telephony service to the subscribers of the optical network system 100. However, other telephony service such as Internet Protocol (IP) telephony can be supported by the data service hub or head end 110. If only Internet Protocol telephony is supported by the head end 110, then it is apparent to one of ordinary skill in the art that the telephone switch 345 could be eliminated in favor of lower cost VoIP equipment. For example, in another exemplary embodiment (not shown) a telephone switch 345 could be substituted with other telephone interface devices such as a soft switch or a gateway. But if the telephone switch 345 is needed, it may be located remotely from the data service hub 110 and can be connected to any of several conventional methods of interconnection.

The head end 110 can further comprise a logic interface 350 that is connected to the cable modem termination system (CMTS) 355. The logic interface 350 can comprise a voice-over-internet protocol (VoIP) gateway when required to support such a service. The cable modem termination system 355 is the same as the ones described above. The logic interface 350 and cable modem termination system (CMTS) 355 can read packet headers originating from the cable modems 108 and the Internet router 340. The logic interface 350 can also translate interfaces with the telephone switch 345. After reading the packet headers, the logic interface 350 and the CMTS 355 can determine where to send packets of information.

The head end 110 can further comprise an optical receiver 102 which is coupled to a wavelength division multiplexer 103 for receiving upstream optical signals originating from the cable modem 108 or the set top box 107. The optical receiver 102 can comprise one or more photo receptors or photo diodes that convert optical signals into electrical signals. The optical receiver 102 can be coupled to an upstream RF diplexer 320. A diplexer 302 is typically a passive device that implements frequency domain multiplexing. The two outputs of the radio frequency diplexer 302 of FIG. 2C can include a low frequency portion for the set top box signals that are typically in about the 5 to 20 MHz range and a high output portion which may include the cable modem signals in about the 22-40 MHz range. The upstream radio frequency diplexer 302 is coupled to an amplifier 212. The amplifier 212 is designed to amplify the low frequency and low power set top box signals. The lower-amplitude STB signals are amplified by twice the difference in optical powers which may be designed into each ONT 105 with its respective dual-mode optical transmitter 203A.

This amplification stage normalizes the level of the two types of upstream signals which include the set top box signals and the cable modem signals. This amplification may prevent the long loop level control in the set top box 107 from over-modulating the laser transmitter 203A in the ONT 105. However, one of ordinary skill in the art recognizes that this amplification stage may not be necessary, as it is possible to set the return levels for the two services (such as the FTB signals and cable modem signals) independently. The amplified signals from the amplification stage 212 are fed into the radio frequency receiver 309 which is coupled to the video services controller 115. The radio frequency receiver 309 demodulates the analog RF signals and feeds them into the video services controller 115 where they are processed.

The high frequency output of the upstream diplexer 302 are fed into the radio frequency receiver 309. The radio frequency receiver 309 demodulates the upstream cable modem signals and are fed into the cable modem termination system 355 where those signals are processed.

Figure 3B:
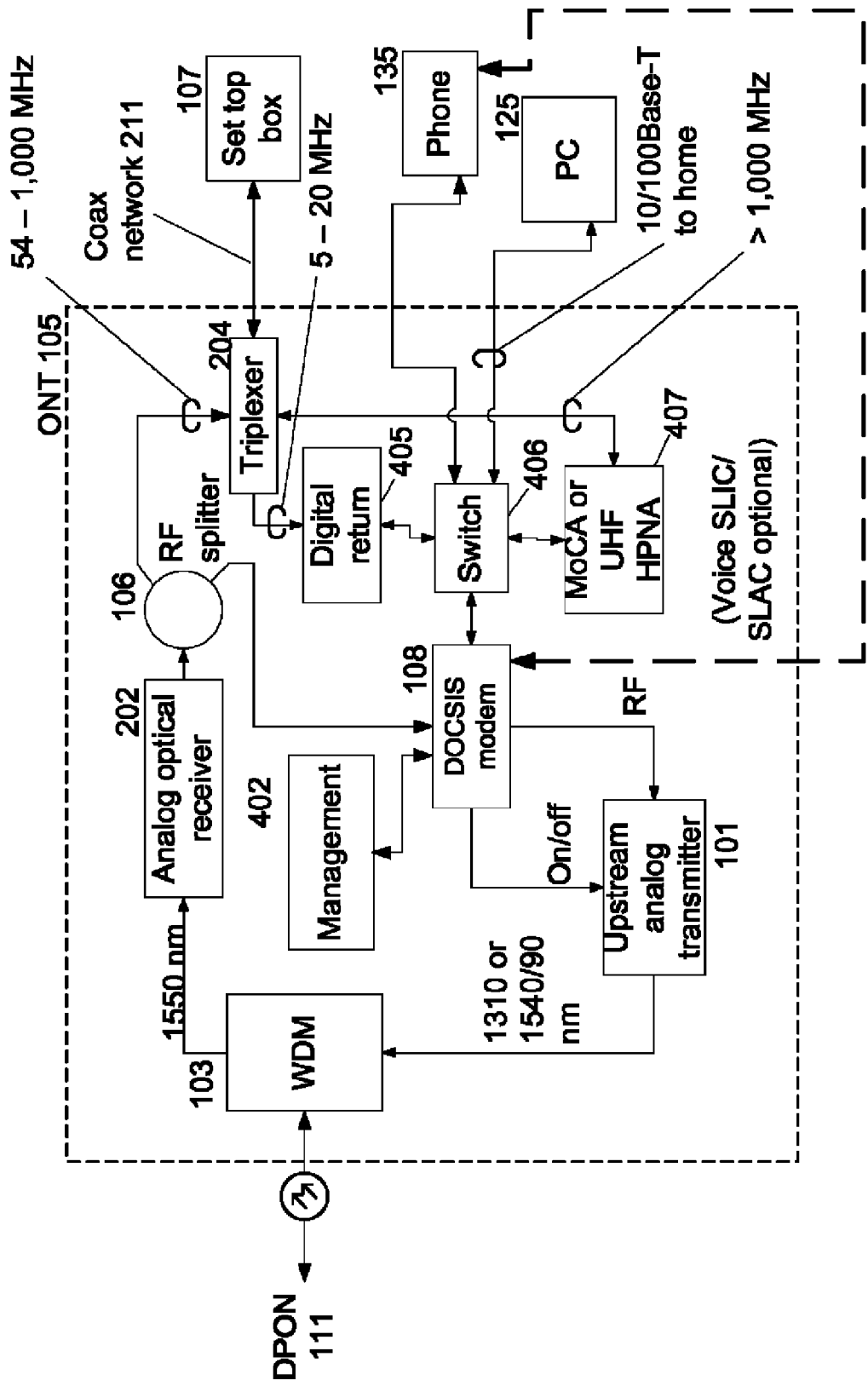
FIG. 3B illustrates a detailed functional block diagram of an optical network terminal (ONT) for the DOCSIS Passive Optical Network (DPON) system of FIG. 3A in which analog RF Return signals from legacy set top boxes are digitized and inputted into a cable modem according to one exemplary embodiment of the invention.

Referring now to FIG. 3B, this Figure illustrates a detailed functional block diagram of an optical network terminal (ONT) 105 for the DOCSIS Passive Optical Network (DPON) system 100 of FIG. 3A in which analog RF Return signals from legacy set top boxes 107 are digitized and inputted into a cable modem 108 according to one exemplary embodiment of the invention. In this exemplary embodiment of the ONT 105, a standard DOCSIS cable modem 108 is positioned within the ONT 105.

In order to provide downstream RF signals for the modem 108, an RF splitter 106 divides the RF signal originating from the analog optical receiver 202 into two paths. One path supplies input to the DOCSIS modem 108, while the other provides downstream RF video signals and control signals through a triplexer 204 to the STB 107 in the home through Coaxial cable network 211. In this exemplary embodiment, there is no need for a modem 108 in the home, because that function is served by the modem 403 in the ONT 105.

Data needs in the home may be served either through the 10/100Base-T connections from a switch 406, and/or through the a Multimedia over Coax Alliance (MoCA) or a Home Phoneline Networking Alliance (HPNA) interface 407 via Coax network 211. These MoCA and HPNA interfaces 407 are understood by one of ordinary skill in the art, and are shown in FIG. 3B.

The switch 406 can comprise a layer three or layer two switch, in which the layers correspond with the layers defined by the Open Systems Interconnection Basic Reference Model (OSI Model or OSI Seven Layer Model). Layer two generally refers to the data link layer in the OSI Seven Layer Model. Layer three generally refers to the network layer in the OSI Seven Layer Model. Most routers operate at the layer three layer, therefore, switch 406 can comprise a router in some exemplary embodiments. The switch 406 can be coupled to a personal computer 125 via a 10/100 Base-T connection/Ethernet port using category five cables. The switch 406 can also comprise a wireless router and communicate with related peripheral devices like the computer 125 through wireless connections, such as an RF link. The switch 406 can also be coupled to the phone 135. Alternatively, the phone 135 could be coupled directly to the cable modem 108 as illustrated with the dashed line. The cable modem 108 may have a media terminal adapter (MTA) that can be used to couple the phone 135 to the cable modem 108.

The triplexer 204 permits signals in multiple frequency bands to reside on the RF network 211, supplying signals to STB 107. The network in a subscriber's premises, such as in a home, may be more complicated, comprising not only a single STB 107, but multiple STBs 107, TVs 706 connected without STBs 107, and computers 125 and other data equipment connected via HPNA or MoCA interfaces 407. In this exemplary configuration, the signals on the Coax network 211 are the downstream RF video signals between the exemplary frequency limits of about 54 to 1,000 MHz, the upstream control signals from the STB 107, in the exemplary frequency range of about 5-20 MHz, and MoCA or HPNA signals at frequencies greater than 1,000 MHz. However, other frequency ranges above or below these limits are within the scope of the invention.

MoCA and HPNA, as mentioned above, are two technologies for transmitting data signals over coaxial cable, and are well-known to those skilled in the art. It is unlikely that both the 5-20 MHz digital return band and the >1,000 MHz band would both be used simultaneously, and it is possible to use the band under 20 MHz for HPNA. Again, this is understood to one of ordinary skill in the art. All of these options are shown in FIG. 4 to illustrate what can be done within the instant teaching.

Figure 1:
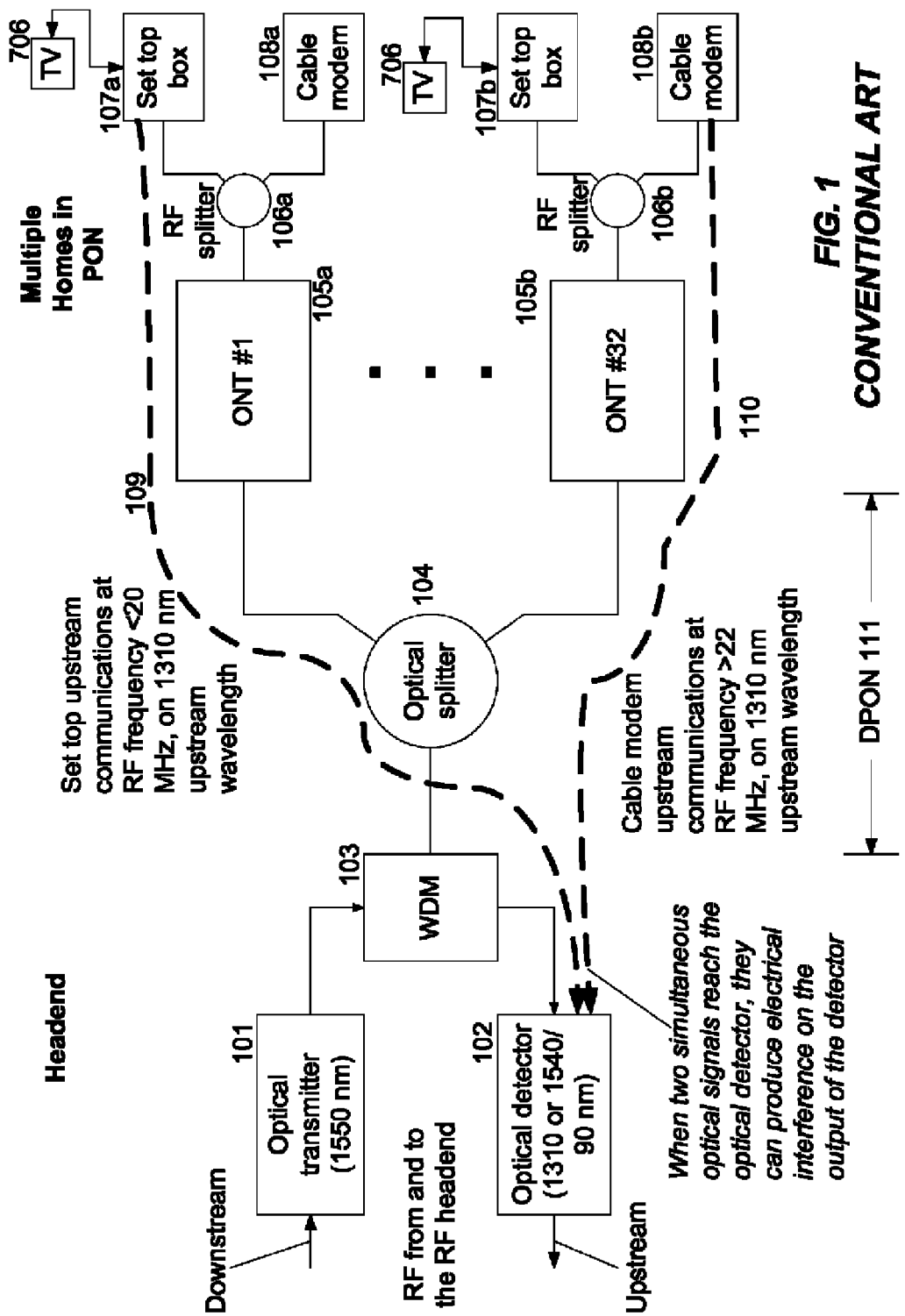
FIG. 1 illustrates a functional block diagram for a conventional passive optical network.

The digital return 405 equipment comprises devices which can detect the upstream RF return data coming out of the subscriber's premises, such as a home, and then digitize it and send it toward the head end 110 of FIG. 1, where the signal can be reconverted to RF for use by the video services controller 115. Further details of the digital return equipment will be describe below in connection with FIGS. 7A-7C.

Generally, the digital return equipment 405 digitizes the RF return signal coming from the STB 107 in the home, and puts the digitized signal in an IP packet with the destination IP address of the receiving device in the head end 110, as taught in FIGS. 7A-7C discussed below. The IP packet is then delivered to the cable modem 108 via Switch 406, for transmission to the head end 110. The cable modem 108 can operate according to standard modem protocols, such as the DOCSIS standard.

The cable modem 108 can be coupled to a management module 402. The management module 402 can provide management functions for the ONT 105. For example, it can turn on and off the downstream optical receiver 202 in response to a command sent from the head end 110. The management module 402 can also report the status of the ONT 105 back to the head end 110. For example, the management module 402 can report the status of the received optical level and transmitter bias for the ONT 105.

The cable modem 108 can control the upstream analog optical transmitter 101. The analog optical transmitter 101 of this exemplary embodiment can be a standard optical transmitter 203, unlike the unique dual mode optical transmitters 203A, 203B described in connection with the exemplary embodiments illustrated in FIGS. 2A, 2B, 4A, and 4C. The optical transmitter can comprise one of fabry-perot (F-P) laser transmitters, distributed feedback lasers (DFBs), or vertical cavity surface emitting lasers (VCSELs). However, other types of optical transmitters 101 are possible and not beyond the scope of the present invention.

The cable modem 108 can turn the analog optical transmitter 203 "ON" when the cable modem 108 senses signals for upstream transmission, such as data signals or RF Return packets derived from the set top box 107. These upstream optical signals are then propagated to the wavelength division multiplexer 103 which, in turn, propagates the optical signals over the optical network 111 to the head end 110.

Figure 3C:
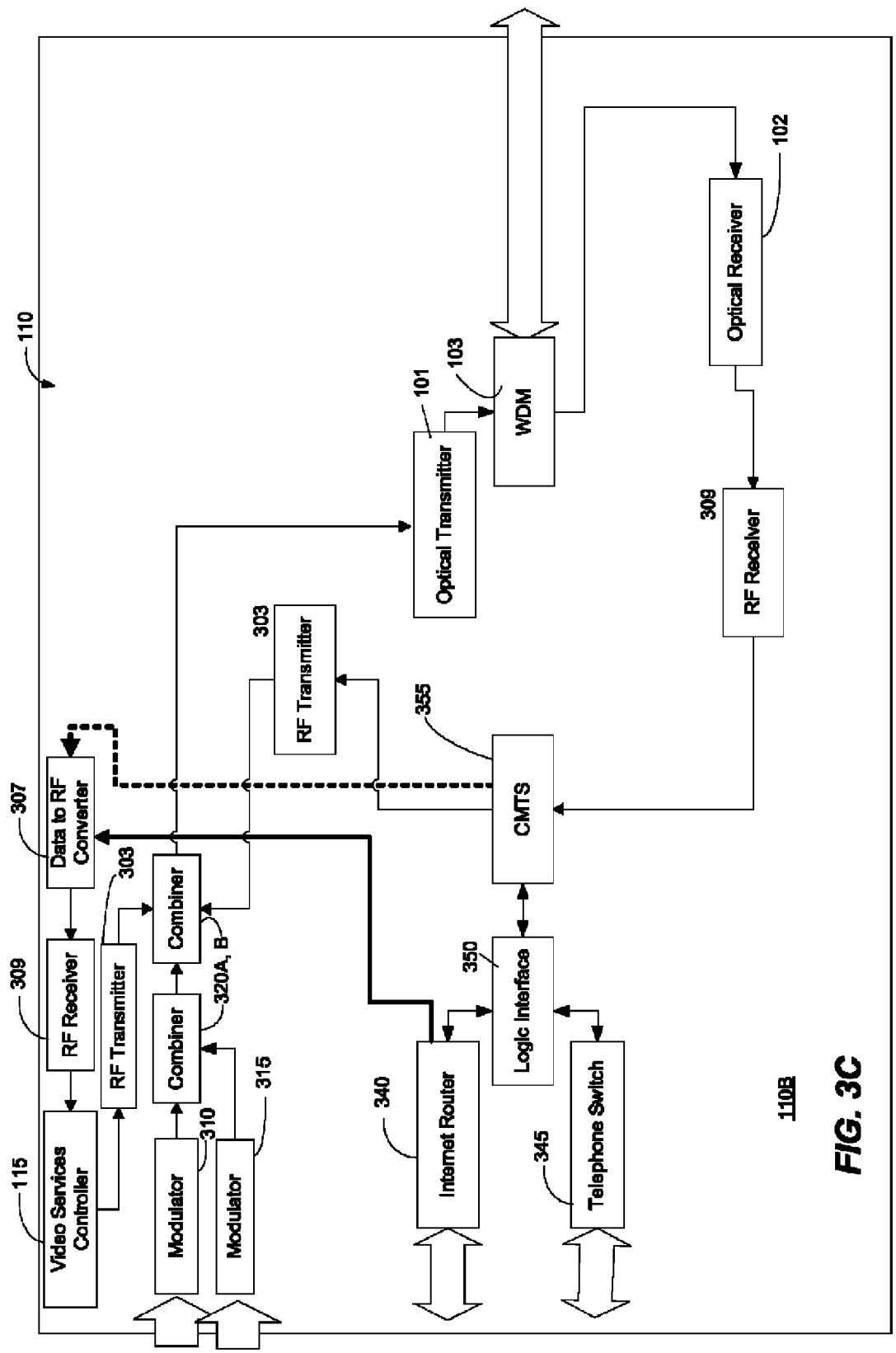
FIG. 3C illustrates a detailed functional block diagram of head end unit for the DOCSIS Passive Optical Network (DPON) system of FIG. 3A in which analog RF Return signals from legacy set top boxes are digitized and inputted into a cable modem in an optical network terminal (ONT) according to one exemplary embodiment of the invention.

Referring now to FIG. 3C, this figure illustrates a detailed functional black diagram of a head end unit 110 for the DOCSIS passive optical network (DPON) system of FIG. 3A in which analog RF return signals from legacy set top boxes 107 are digitized and inputted into a cable modem 108 that is housed in an optical network terminal (ONT) 105 according to one exemplary embodiment of the invention. FIG. 3C has very similar elements compared to the elements of FIG. 2C. Therefore, only the differences between these two figures will be described.

Since the RF return signals from the set top boxes 107 are digitized into packets which are then fed into the cable modem 108, all the signals received at the head end 110 of FIG. 3C are propagated according to a cable modem protocol such as the DOCSIS standard. Therefore, the RF receiver 309 demodulates the upstream cable modem signals and feeds these signals into the cable modem termination system 355. In some exemplary embodiments (not illustrated), the RF transmitter 303 and RF receiver 309 can be part of the CMTS 355 and contained within a single housing for the CMTS 355.

The cable modem termination system (CMTS) 355 can route the RF return packets to either the Internet router 340 or to an appropriate data to RF converter 307. Further details of the data to RF converter 307 will be described below with respect to FIG. 8. And in FIG. 3C, unlike FIG. 2C, there is no amplification stage 212 needed since all information from the optical network terminals (ONT) 105 are sent upstream according to a cable modem protocol such as DOCSIS. Therefore, there would not be any interference between upstream RF return signals and upstream cable modem signals because they are one of the same according to this exemplary embodiment.

FIG. 4B illustrates a detailed functional block diagram of an optical network terminal (ONT) 105 for the DOCSIS Passive Optical Network (DPON) system 100 of FIG. 4A in which analog RF Return signals from legacy set top boxes 107 are digitized and modulate a dual mode optical transmitter 203B having a first low power digital mode and a second high power analog mode according to one exemplary embodiment of the invention. Triplexer 204 of the ONT 105 couples downstream signals from about 54 to 1,000 MHz to the Coax network 211. It sends upstream signals from the set top box 107 in the range of about 5 to 20 MHz to the digital return equipment 405, which is nearly identical to that in FIG. 3B described above.

Furthermore, the triplexer 204 of FIG. 4B via the directional coupler 210 sends signals in the range of about 22 to 40 MHz to the input of the upstream dual mode optical transmitter 203B. The directional Coupler 210 also can extract a portion of the signal power and route it to the radio-frequency (RF) detector 207. When the cable modem 108 transmits upstream information, it is again expected to transmit at frequencies above 22 MHz. If the RF detector 207 detects transmission from the cable modem 108, then the upstream dual-mode optical transmitter 203B is placed in a high-powered linear, analog mode.

Any RF return transmissions from STB 107 are digitized by the digital return equipment 405 as described above. The output form the digital return equipment 405 is fed into a buffer and control device 501. The buffer and control device performs several functions: (1) It puts the output of the digital return equipment 405 into a format that can be directly transmitted upstream, including adding a run-in sequence for synchronizing the receiver in the head end. A return confirming message is not required in the format, because the STB 107 protocol will take care of any missed transmissions.

If an RF transmission from the cable modem 108 is in progress, an Inhibit line 333 receives a signal generated by the RF detector 207, causing the buffer and control device 501 to hold the transmission from the digital return equipment 405 until the cable modem 108 transmission has ceased. When the cable modem 108 transmission stops, the RF detector 207 discontinues sending any signals along the inhibit line 333 which allows the buffer and control device 501 to activate the upstream dual mode optical transmitter 203B and placing it in a low power digital mode.

If a transmission from the digital return equipment 405 is in progress when a cable modem 108 transmission is detected, the RF detector 207 sends a signal along the inhibit line 333, which stops the buffer and control device 501 from outputting any further data. The RF detector 207 also sends a signal along the high power linear mode command control line 337 when the RF detector receives a transmission from a cable modem 108. Meanwhile, the entire transmission from the buffer and control device 501 can be repeated after the Cable Modem 108 transmission has ceased. The inhibit and high power linear mode command can be one and the same signal, produced when RF detector 207 detects a Cable Modem 108 transmission.

The buffer and control device 501 can comprise a memory device, such as shift register, and a controller, such as a central processing unit (CPU) or microcontroller. The shift register can comprise a First-In-First-Out (FIFO) shift register but other registers are not beyond the scope of the invention. The memory device of the buffer and control device 501 can also comprise other types of memory devices such as RAMs, ROMs, EEPROMs, DRAM, flash memory, and other like devices.

Any time a transmission from a cable modem 108 is detected by RF detector 207, the upstream dual mode optical transmitter 203B is placed in a high-power analog transmission mode by the high power linear mode command issued by RF detector 207. Thus, the upstream dual mode optical transmitter 203B functions as a low-powered digital transmitter 203B when STB 107 is transmitting RF return signals, and the optical transmitter 203B functions as a high-powered analog transmitter 203B when the cable modem 108 is transmitting. The action of the buffer and control device 501 in holding the STB 107 transmission if there is a transmission from a cable modem 108 is optional, but desirable just in case both devices (in the same subscriber premises/home) try to transmit at the same time.

The optical signals generated by the upstream dual mode optical transmitter 203B are propagated to the wavelength division multiplexer (WDM) 103. From the WDM 201, the optical signals are propagated over the optical network 111 to the head end 110.

Referring now to FIG. 4C, this figure illustrates a detailed functional block diagram of a head end unit 110 for the DOCSIS passive optical network (DPON) system of FIG. 4A in which analog RF return signals from the Legacy set top boxes 107 are digitized in the optical network terminal 105 and modulate a dual-mode optical transmitter 203B which has a first low power digital mode and a second high power analog mode according to one exemplary embodiment of the invention. The head end unit 110 of FIG. 4C is very similar to the head end unit 110 of FIG. 2C. Therefore, only the differences between these two figures will be described. In this exemplary embodiment the output of the optical receiver 102 is connected to a coupler 210 instead of the diplexer 302.

The coupler 210 does not make any frequency selections with respect to the upstream signals. Therefore, these two outputs have both the digital cable modem signals and the digital RF return signals (packets). The coupler 210 feeds an amplification stage 212. This amplification stage 212 is similar to that described above with respect to FIG. 2B. The RF return packets are amplified in amplification stage 212 are fed to the data to RF converter 307. Meanwhile, the cable modem signals are sent to the radio frequency receiver 309 where they are demodulated and then fed into the cable modem termination system 355.

Referring now to FIG. 5, this figure illustrates a detailed functional block diagram for a dual mode optical transmitter 203A, 203B according to one exemplary embodiment of the invention. The dual mode optical transmitters 203A, 203B of FIGS. 2A, 2B, 4A, and 4B are unique in that each must, at different time, transmit in either a low-powered mode or a high-powered mode.

Most prior art optical transmitters 203 transmit at only one power level. It is known to one of ordinary skill in the art to close a power leveling loop around an optical transmitter 203, but it is not known to control the same optical transmitter 203 to two different power levels, while having it turn on quickly in the correct mode.

The exemplary embodiments of the dual mode optical transmitters 203A, 203B of FIGS. 2A, 2B, 4A, and 4B place slightly different requirements on the optical transmitter 203. This section will first address the dual-mode optical transmitter 203B of FIGS. 4A and 4B, then a simplification will be described that can be made to construct the dual mode optical transmitter of FIGS. 2A and 2B.

FIG. 5 illustrates a dual mode optical transmitter 203B that can be used with the exemplary embodiments illustrated in FIGS. 4A and 4B. The dual mode optical transmitter 203B can be modified slightly so that it can be used with the exemplary embodiments illustrated in FIGS. 2A and 2B.

The dual mode optical transmitter 203B can comprise a laser diode D601 that can convert electrical signals to light. As is understood to one of ordinary skill in the art, it is common to pair a laser diode D601 with a back facet diode D602. Back facet diode D602 receives a sample of the light emitted from laser diode D601 and converts it into an electrical signal. It converts the light to an electrical current, which in turn is converted to a voltage in resistor R602. Thus, the voltage on resistor R602 is proportional to the light output from Laser diode D601. This voltage is used in a feedback loop to control the light output from laser diode D601. Such feedback loops are known to one of ordinary skill in the art.

The level control feedback loop includes loop amplifier A603. As is understood to one of ordinary skill in the art, amplifier A603 compares the voltage developed across resistor R602, with the reference voltage on it's non-inverting positive (+) input. Normally this voltage on the positive (+) input is developed from a simple voltage divider or from some other stable voltage source. If there is a difference in the voltages on the two inputs, then amplifier A603 adjusts it's output until the difference becomes 0.

This is accomplished by the output of the amplifier A603 adjusting the current in laser diode D601, through resistor R601 and inductor L601. The purpose of resistor R601 and inductor L601 is to allow amplifier A603 to adjust the current through D601 (which in turn control's it's light output), while keeping the modulation applied to the diode, from being shunted to ground. The modulation of the laser diode D601 is discussed below.

As is understood to one of ordinary skill in the art, there are usually feedback components, consisting of resistors and capacitors and perhaps diodes, placed between the output of loop amplifier 603 and it's inverting negative (−) input. These components control the dynamics of the described light control loop.

In order to fulfill the requirements placed on the dual mode optical transmitter 203A, 203B by either exemplary embodiments illustrated in FIG. 2A or 4A, it is necessary to change the light output depending on whether the optical transmitter 203A, 203B is in a high or low powered mode.

The mode for the exemplary embodiment illustrated in FIGS. 4A and 4B is determined by the state of the high power linear mode command produced by the RF detector 207 and the low power digital mode command produced by the buffer and control unit 501. If the High power linear mode command is active, switch S1b is closed, connecting a high reference voltage level to the positive (+) input of amplifier A603, forcing the laser diode D601 into a high output power mode.

On the other hand, if the low power digital line is active, switch S2c is closed, putting a lower voltage reference on the positive (+) input of amplifier A603, forcing a lower power output from laser diode D601. Referring briefly to FIG. 6A, if neither the High power or Low power lines are active, then Logic 601 detects this condition, and cause switch S3 to close, effectively turning off D601. Logic 601 can comprise a central processing unit (CPU) or microcontroller. However, other logic units are not beyond the scope of the invention.

Referring back to FIG. 5, with respect to modulating the laser diode D601, as is understood to one of ordinary skill in the art, it is common to couple modulation of the laser diode D601 through capacitors C601, C602 and linear driver amplifier A601. When neither the high or low power modes are active, switch S1a in FIG. 5 is in the position shown, and connects the coupling capacitor C602 in the analog circuit to a bias voltage Valogbias, which is approximately equal to the voltage on the cathode (low end as FIG. 5 is drawn) of laser diode D601. This keeps C602, the coupling capacitor, charged to the approximate potential it will be charged to when it is switched to the Laser diode D601 cathode.

Keeping the coupling capacitor C602 charged to its approximate operating potential improves the speed at which the optical transmitter 203 can come on, as there is no need to charge coupling capacitor C602 once it is switched to the Laser diode D601 anode. Note that it is not necessary to switch the input of linear driver amplifier A601, as the normal signal level on the input will be zero "0". Switching capacitor C602 to the "Valogbias" position shown will also prevent any noise on the input line reaching the laser diode D601.

When the high power linear mode line 337 receives a signal from the RF detector 207 of FIG. 4B, indicating that RF detector 207 of FIG. 4B has detected a transmission from a cable modem 108, then switches S1a and S1b are thrown by the logic 601 (of FIG. 6) to the active states, the opposite of the states illustrated in FIG. 5. Through switch S1a, the cable modem signal is connected to the laser diode D601 such that it can modulate the Laser diode D601. When switch S1b is thrown, laser diode D601 is biased to a high power state, which is required for transmission of the cable modem signals.

The low power digital path (RF return data from STBs 107) of FIG. 5 is used when a transmission is detected from the digital return equipment 405 through buffer and control 501 unit of FIG. 4B. The data signal passes through digital driver amplifier A602. This amplifier A601 is not a linear amplifier, as is linear driver amplifier A601. Rather, as is understood by one of ordinary skill in the art, amplifier A602 includes a shaping circuit, which ensures that the output only takes on two values: a low value that turns on laser diode D601 and a high value that substantially turns off laser diode D601.

It is necessary to keep the coupling capacitor C603 in this path charged for the same reason it is necessary to keep coupling capacitor C602 of the high power path charged when it is not in use. Keeping the coupling capacitor C603 in this low power digital path charged can increase the speed of turn-on and stabilization time of the laser diode D601. The charge on coupling capacitor C603 is maintained when no information is being transmitted, by virtue of switches S2a and S2b being in the positions shown.

Switch S2a connects the input to digital driver amplifier A602 to a square wave source in order to keep the average output of amplifier A602 at it's fifty percent value, where it will be when transmitting data. Switch S2b connects the far end of coupling capacitor C603 to a bias voltage, Vdigbias, equal to the voltage on the cathode of laser diode D601 when it is transmitting digital data. Note that Valogbias and Vdigbias voltages are close to the same value, so in some exemplary embodiments (not illustrated) the same voltage can be used for both.

To form the dual mode optical transmitter 203A of FIGS. 2A and 2B in which only analog signals are transmitted, the digital driver amplifier A602 and its associated circuits, including switch S2c, can be eliminated. In other words, to form the optical transmitter 203A of FIGS. 2A and 2B, the optical transmitter 203B is simplified by removing these components.

Referring now to FIG. 6B, this figure illustrates a functional block diagram having logic 601 that controls a low power optical transmitter 101A and a high power optical transmitter 101B according to one exemplary embodiment of the invention. Instead of using dual mode optical transmitters 203A, 203B as illustrated in FIGS. 2A, 2B, 4A, and 4B, two separate optical transmitters 101A, 101B can be used. One of the optical transmitters 101A can be a low power transmitter that handles the RF return signals from the set top box 107 while the other optical transmitter 101B can be a high power transmitter that handles the signals from a cable modem 108. Depending on the embodiment, the two separate optical transmitters 101A, 101B can be of the same type meaning that they could each be an analog optical transmitter as needed in the exemplary embodiment of FIGS. 2A, 2B. Alternatively, the two separate optical transmitters 101A, 101B may comprise an analog optical transmitter and a digital optical transmitter as needed in the exemplary embodiment of FIGS. 4A, 4B.

Referring now to FIG. 7a, this Figure is a functional block diagram illustrating some core components of digital return equipment 405 of FIGS. 2A, 2B, 4A, and 4B according to one exemplary embodiment of the invention. The RF return signals produced by each set top box 107 may comprise signals that bear digital modulation, usually but not necessarily QPSK modulation.

These RF return signals are supplied from the set top box 107 to the RF triplexer 204 of FIGS. 3B and 4B, which separates the higher-frequency downstream RF signals from the lower-frequency upstream signals. The lower frequency upstream signal typically comprises a single limited-bandwidth RF return signal. It is one object of the present discussion to capture this analog RF signal, convert it to digital form and relay it back to the head end 110, where it is converted back to an analog RF signal that can be received by a RF receiver 309 that is coupled to the video services controller 115.

Data from the low port of RF triplexer 204 is supplied to an RF signal detector 517, which determines when an analog RF signal is present. When a signal appears, RF signal detector 517 notifies a controller 519 of the presence of the signal, and controller 519 can operate a switch 521.

When an RF signal is received and detected by RF signal detector 517, then it is converted to digital form in A/D converter 509. Prior to being converted to digital form, it is sampled in the sample-and-hold function, which can include switch 521 and hold capacitor 523. This sample and hold function is well-known to one of ordinary skill in the art. Switch 521 is closed periodically, resulting in the voltage on the low port of diplexer 507 being transferred to capacitor 523. Then switch 521 is opened, and the voltage remains on capacitor 523 while A/D converter 509 converts the voltage to a digital word.

The digital word typically must comprise a minimum number of bits in order to provide an adequate signal-to-noise ratio (S/N) for recovering the data, as is understood by one of ordinary skill in the art. For recovery of QAM, it is estimated that four bits will yield an adequate S/N. However, this assumes that the signal occupies the entire four bit range. If the signal is too low in amplitude it will not be transmitted at reasonable S/N, and if the signal is of too great an amplitude, it will clip the A/D converter 509 and will fail to supply a useable signal to RF video service control receiver 309. The video services controller 115 has the ability to smooth set top box output to a required level or amplitude, but when a set top box is first added to the system, its level may not be correct. Thus, the A/D converter 509 must have adequate range to digitize the signal even if it is at the incorrect amplitude.

One of ordinary skill in the art knows that the minimum rate at which the signal can be sampled is twice the highest frequency of the signal being sampled. This limitation is known as the Nyquist sampling theorem. This is illustrated in FIG. 7b that presents a graph 526. The sampling frequency, $f_S$, at which switch 521 is cycled, usually must be more than twice the highest frequency in the RF return signal. This highest frequency is represented by $f_H$. Thus, the sampling frequency $f_S$ must be equal to or greater than two times $f_H$.

The data rate needed to support data transmission is given by the product of the sampling frequency $f_S$ and the number of bits transmitted, n. Thus, if 8 bits are needed to transmit an adequate S/N (allowing for errors in signal level), and $f_H$=15 MHz, the minimum data rate is 2.times.15.times.8, or 240 Mb/s. In practice, a higher data rate must be used, to compensate for limitations of real filters. Two methods are used to reduce the data rate that must be transmitted. First, the frequency of the signal is reduced, then the number of bits of data is reduced by scaling the amplitude of the digitized signal (data scaling). These methods will be explained below.

After A/D converter 509, the digital signal is propagated to the data conditioner 511. The data conditioner 511 can comprise a down conversion processing unit 527 and a low pass filter 529. Down conversion processing unit 527 comprises a mixing (multiplication) process that takes place in the digital domain. This function may also be implemented in the RF domain before switch 521, as is understood by one of ordinary skill in the art. In the down conversion unit 527, each sample of the digitized signal is multiplied by a number representing a sinusoidal waveform. The number representing a sinusoidal waveform is generated in the digital domain, $f_{LO}$ 531, as illustrated in FIG. 7c, and is the local oscillator signal shown in the spectrum diagram of FIG. 7c.

As is understood by one of ordinary skill in the art, when the RF return signal is mixed with $f_{LO}$ 531, either in the digital domain shown or in the RF domain, several components are generated. These include the difference signal 533, the sum signal 534, and a number of harmonics 536. All of these components with the exception of the difference 533, are removed by low pass filter 529, whose shape is shown by the dashed line 537. As is understood by one of ordinary skill in the art, it is sometimes possible to set $f_{LO}$ equal to the carrier frequency of the incoming signal. This can result in the lowest possible data rate.

Since the frequency of the sampled signal is now lower, being the difference frequency 533, the number of times the signal is sampled may be reduced without violating the Nyquist sampling theorem. This operation is performed in sample elimination unit 538, which removes unnecessary samples. In a simple case, this function may be performed by simply dropping every other sample point, or by dropping two of three sampling points, etc. In a more sophisticated sample reduction algorithm, the sampling rate may be reduced by choosing sampling times and interpolating between samples of the incoming signal. This technique is understood by one of ordinary skill in the art.

The data scaling unit 539 removes unnecessary numbers of bits from each sample, while maintaining the maximum scaling of the data. The technique is familiar to one of ordinary skill in the art, and for example has been used in the British NICAM (Near Instantaneous Compression and Modulation) method of transmitting digital audio information on an analog channel.

Referring now to FIG. 8, this Figure is an exemplary functional block diagram that describes further details of a data-to-RF converter 307 of FIGS. 3A, 3C, 4A, and 4C according to one exemplary embodiment of the invention. When the RF return packets containing the set top box upstream transmission are fed to the data-to-RF converter 307 at the head end 110, they usually must be restored to their original form. In the scaling restoration unit 317, the data scaling of the RF analog signals represented in the RF return packet is restored, reversing the actions performed by the data scaling unit 539 of the data reducer 511 of FIG. 7a.

In the sampling restoration unit 319, the sampling is restored to the original sampling rate by adding samples between the transmitted samples. Interpolating between transmitted samples is understood by one of ordinary skill in the art. The frequency of the signal is up-converted to the original frequency in the frequency up converter 321, by mixing it with a local oscillator signal. Next the signal is filtered by bandpass filter 323. The signal is then converted to analog form in D/A converter 324. Thus, at the output of D/A converter 324 is the data from the Low port of the RF triplexer 204 of the optical network terminal 105, which was supplied to the input of the sample and hold circuit 521 and 523 of FIG. 7a.

Method for Propagating Upstream Cable Modem Signals and RF Return Video Control Signals Over the Same Optical Network One of ordinary skill in the art will appreciate that process functions or steps performed by the elements of the system 100 may comprise firmware code executing on a microcontroller, microprocessor, or DSP processor; state machines implemented in application specific or programmable logic; or numerous other forms without departing from the spirit and scope of the invention. In other words, the invention may be provided as a computer program which may include a machine-readable medium having stored thereon instructions which may be used to program a computer (or other electronic devices) to perform a process according to the invention. The machine-readable mediums disclosed herein may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Certain steps in the processes or process flow described in all of the logic flow diagrams referred to below must naturally precede others for the invention to function as described. However, the invention is not limited to the order of the steps described if such order or sequence does not alter the functionality of the present invention. That is, it is recognized that some steps may be performed before, after, or in parallel other steps without departing from the scope and spirit of the present invention.

Additionally, it is recognized that certain steps could be re-arranged in different sequences or entirely deleted without deviating from the scope and spirit of the invention. In other words, it is recognized that the steps illustrated in the flow charts represent one way of achieving a desired result of propagating upstream STB and cable modem signals. Other ways which may include additional, different steps or the elimination of steps, or the combination of eliminating steps and adding different steps will be apparent to one of ordinary skill in the art.

Further, one of ordinary skill in programming would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Referring now to FIG. 9, this figure is a logic flow diagram illustrating exemplary steps 900 for propagating upstream cable modem signals and RF return set top box (STB) signals that correspond to the system of FIGS. 2A and 2B according to one exemplary embodiment of the invention. Step 905 is the first step of the method 900 for propagating upstream cable modem signals and STB signals over the same optical network 100. In step 905, the input of a diplexer 204A can receive combined upstream RF STB signals and cable modem signals. Next, in step 910, the combined upstream signals can be divided between an input of a second diplexer 204B and the input of a dual-mode analog optical transmitter 203A.

Next, in step 915, the upstream RF STB signals can be separated from the upstream RF cable modem signals with the second diplexer 204B. The upstream RF STB signals can be propagated to a first radio frequency detector 205. This first radio frequency detector 205 can be designed to detect relatively low frequencies or those on the order of about between 5 to 20 MHz.

In step 925, the diplexer 204B propagates the upstream RF cable modem signals to a second radio frequency detector 207. The upstream RF cable modem signals typically have a frequency range of about 22 to 40 MHz.

In decision step 930, the low frequency RF detector 207A determines if there are any upstream RF return STB signals present. If the inquiry to decision step 930 is negative, then the "no" branch is followed to decision step 945. If the inquiry to decision step 930 is positive, then the "yes" branch is followed to step 935.

In step 935 the low frequency RF detector 205 can activate a low power mode of the dual-mode analog optical transmitter 203A. Next, in step 940, the upstream RF return STB signals can be converted to the optical domain with the low power mode of the dual-mode analog optical transmitter 203A. These converted STB optical signals can then be transmitted over the optical network and sent to the head end 110. The output of step 940 has two branches: one that leads to step 965 and one that leads to decision step 945. This means that if there are any optical signals based on communications from the set top box 107, they are sent upstream to the head end 110 and managed as set forth in step 965. Meanwhile, in parallel with step 965, the ONT 105 continues to check to determine if any cable modem signals from the cable modem are being sent as set forth in decision step 945.

In decision step 945, the high frequency RF detector 207B can determine if there are any upstream cable modem signals present. If the inquiry to decision step 945 is negative, the "no" branch is followed to step 960. If the inquiry to decision step 945 is positive, then the "yes" branch is followed to step 950.

Next, in step 950, the high frequency RF detector 207 can activate a high power mode of the upstream analog optical transmitter 203A. In step 955, the cable modem signals from the high frequency RF detector 207 can be converted with the high power mode of the dual-mode analog optical transmitter 203A.

In step 960, the upstream optical signals which can comprise the upstream RF STB signals or the upstream cable modem signals or both are propagated over the optical network 111 to the head end 110. Next, in step 955, the head end 110 can receive the combined high power optical cable modem signals and the low power optical RF return STB signals. Next, in step 970, the optical receiver 102 can convert the optical signals to the electrical domain.

In step 975, an upstream diplexer 302 can separate the RF return STB signals from the RF cable modem signals. In step 980, the RF return STB signals can be amplified by a predetermined amount, such as by two times the difference in optical power levels as determined by the dual-mode upstream analog optical transmitter 203A of FIG. 2B. As noted previously, this amplification stage is optional. This means that this step 980 can be skipped if amplification is not used.

Next, in step 985, the upstream cable modem signals can be received and processed with the cable modem termination system 355 about being demodulated by the RF receiver 309. Similarly, the RF return STB signals can be processed by the video services controller 115 after being demodulated by the RF receiver 309. The process then ends.

Referring now to FIG. 10, this figure is a logic flow diagram illustrating exemplary steps 1000 for propagated upstream cable modem signals and RF return set top box (STB) signals that correspond to the system 100 of FIGS. 3A and 3B according to one exemplary embodiment of the invention. Step 1005 is the first step of the process 1000 for propagating upstream cable modem signals and set top box signals over the same optical network 100.

In step 1005, the triplexer 205 of an optical network terminal (ONT) 105 receives RF return signals from STB 107. Next, in routine 1015 the upstream RF return STB signals are converted into STB packets with digital return equipment 405 as illustrated in FIG. 3B. Further details of routine 1015 for digitizing the RF return STB signals will be discussed in further detail below in connection with FIG. 12.

After the RF return signals are converted into STB packets, they can be combined with other packets in the cable modem 403 as illustrated in FIG. 3B. In Step 1025, the combined STB packets and other data packets or voice packets can be modulated onto a radio frequency carrier with a modem 403 according to a cable modem protocol, such as DOCSIS.

Next, in decision step 1030, the cable modem 403 determines if packets have been received. If the inquiry to decision step 1030 is negative, then the "no" branch is followed back to step 1020. If the inquiry to decision step 1030 is positive, then the "yes" branch is followed to step 1035.

In step 1035, the cable modem signals are converted to the optical domain with an upstream analog optical transmitter 203. Next, in step 1040, the converted optical signals are propagated upstream over the optical network 111.

In step 1045, the cable modem optical signals are received by the head end 110. In step 1050, the received cable modem optical signals are then converted to the electrical domain with the optical receiver 102. In step 1055, the radio frequency receiver 309 demodulates the cable modem signal.

In step 1060, the data packets and the STB packets containing the video control information are routed with the cable modem termination system (SMTS) 355. Next, in routine 1065, the digitized upstream STB packets are converted to the radio frequency domain with a data to RF converter. Further details of the steps of routine 1065 are described below with respect to FIG. 13.

Next, after the upstream STB packets have been converted to the analog radio frequency domain, the upstream STB signals are demodulated with a radio frequency receiver 309. Next, the demodulated STB signals are processed with the video services controller 115. The process then ends.

Returning now to FIG. 11, this figure is a logic flow diagram illustrating exemplary steps 1100 for propagating upstream cable modem signals and RF return set top box signals that correspond to the system of FIGS. 4A and 4B according to one exemplary embodiment of the invention.

Step 1105 is the first step in this method 1100 propagating upstream cable modem signals and set top box signals over the same optical network 100.

In step 1105, the optical network terminal (ONT) 105 can receive combined upstream RF return set top box signals from a set top box 107 and upstream cable modem signals from the cable modem 108 with the triplexer 202. Next, with the triplexer 204, in step 1110 the upstream RF return STB signals can be separated from the upstream RF cable modem signals with the triplexer 204. Next, in route 1115, the upstream RF return STB signals can be digitized and transformed into STB packets with digital return equipment 405. Further details of route 1115 will be discussed below in connection with FIG. 12.

In step 1120, the upstream STB packets can be received with the buffer and control unit 501. Next, in step 1125, a directional coupler 210 can divide the upstream RF cable modem signals between the input of an RF detector 207 and the input of a dual-mode optical transmitter 203B.

Next, in decision step 1130, the radio frequency detector 207 can determine if there are cable modem signals present that are propagated through the directional coupler 210. If the inquiry to decision step 1130 is negative, then the "no" branch is followed to decision step 1155. If the inquiry to decision step 1130 is positive, then the "positive" branch is followed to step 1135.

In step 1135, the upstream digital STB packets are held with the buffer and control unit 501. Next, in step 1140, the upstream cable modem signal from the cable modem 108 are converted to the optical domain with a high power analog and linear mode of the dual-mode optical transmitter 203B. The process then continues to decision step 1155.

After step 1140, the process continues to step 1150 in which the optical cable modem signals are propagated over the upstream optical network 111. Next, in decision step 1155, the buffer and control unit 501 determines if upstream STB packets are present within the buffer of the buffer and control unit 501. If the inquiry to decision step 1155 is negative, then the "no" branch is followed to step 1170. If the inquiry to decision step 1155 is positive, then the "yes" branch is followed to step 1160.

In step 1160, the buffer and control unit 501 activates a low power mode of the dual-mode optical transmitter 203B. This low power mode is digital in nature relative to the analog or high power linear mode that can be set for this upstream optical transmitter 203B.

In step 1165, the STB packets can be converted to the optical domain with the low power mode of the dual-mode optical transmitter 203B. In step 1175, the head end 110 can receive the combined high power optical cable modem signals and/or the low power optical STB packet signals. Next, in step 1180, the optical signals can be converted to the electrical domain with an optical receiver 102.

Next, in step 1183, the combined upstream cable modem signals and the upstream STB packets can be fed into a radio frequency receiver 309 which only processes the cable modem signals and does not process any STB packets. This RF receiver 309 can demodulate the cable modem signals. Next, in step 1185 the demodulated RF return STB signals can be fed into the cable modem termination system (CMTS) 355.

In step 1190, an amplifier stage can amplify the set top RF return packets with an amplifier 212. The amplifier stage 212 can amplify the STB packets by two times the amount or level in the optical transmitter 203 of the ONT 105.

In step 1195, the upstream STB packets can be sent to a converter 307. In step 1197, the digitized upstream STB packets can be converted back into the analog radio frequency domain. Further details of routine 1197 will be discussed below in connection with FIG. 13.

Subsequently, in step 1198, the RF return STB signals can be demodulated with another radio frequency receiver 309. And lastly, the STB signals can be processed with the video service controller 115. The process then ends.

Referring now to FIG. 12, this Figure is a logic flow diagram illustrating an exemplary sub-method or subroutine 1015, 1115 of FIGS. 10 and 11 for scaling RF return data received from set top box 107. This sub-method or subroutine can be performed by a data scaling unit 539 illustrated in FIG. 7a according to one exemplary embodiment of the invention. FIG. 12 uses an example of reducing a sample down to four bits, though other reductions can be used and are not beyond the scope of the invention. The algorithm starts at step 1205. A counter, called an MSB (most significant bit) counter is used in the routine to keep track of the number of places on the left of a data word have been eliminated, as will be evident from the description below. The MSB counter is initially set to a count of 0 in step 1210.

In step 1215, a block of data, such as, but not limited to, thirty-two eight-bit bytes, are read and processed. Within that block of data, each sample is examined in step 1220 to determine if the MSB is a 1 or a 0. If all samples in the block have a 0 in the MSB position, then the inquiry to decision step 1220 is answered "No", meaning that the MSB is not used in any data in that set of bytes. If the inquiry to decision step 1220 is negative, then the "No" branch is followed to step 1225 in which the data may be shifted left. At the same time, the MSB counter referred to above is incremented by 1, to keep track of how many times the block has been shifted. Operation then returns to decision step 1220, which again decides whether the MSB is used. If not, then the process repeats through step 1220, until the MSB is used. Note that this process applies to all the data words in the block of data being processed.

When the MSB is used, then the inquiry to decision step 1220 is positive and the "Yes" branch is followed to step 1230 in which all bits of the word are dropped except for the four most significant bits. Thus, the routine 1015, 1115 has caused the retention of the four most significant bits that have data, in the block of data. These bits are transmitted in step 1235 along with the state of the MSB counter, which can be used to reconstruct the waveform at the head end 110.

Referring now to FIG. 13, this figure illustrates an exemplary scaling restoration sub-process or subroutine 1065, 1197 of FIGS. 10 and 11 according to one exemplary embodiment of the invention. This restoration sub-process or subroutine starts at step 1305. The value of the MSB counter is read in step 1310, then data is read in 1315. For each data word, the data is shifted right by the MSB counter value in step 1320, with leading zeros being added to the left of the transmitted bits. Thus, the value that was originally developed in the sample elimination unit 538, is restored. Of course, if fewer than the four most significant bits in the original word have been dropped, then some least significant bits are converted to zero by the process, but they represent only small errors in the recovered signal, and are tolerable.

In decision step 1325, it is determined whether all of the data the current transmission or block has been read. If the inquiry to decision step 1325 is negative, then the "No" branch is followed back to step 1315. If the inquiry to decision step 1125 is positive, then the "Yes" branch is followed to step 1330 where the data scaling restoration process ends.

While the system and method have been described in exemplary embodiments, alternative embodiments of the system and method will become apparent to one of ordinary skill in the art to which the present invention pertains without departing from its spirit and scope. Therefore, although this invention has been described in exemplary form with a certain degree of particularity, it should be understood that the disclosure has been made only by way of example, and the numerous changes and the details of construction and the combination and arrangement of parts or steps may be resorted to without departing from the spirit of scope of the invention. Accordingly, the scope of the present invention is defined by the appended claims rather than the foregoing description.

What is claimed is:

1. An optical network terminal comprising:
    a dual mode optical transmitter having two modes of operation, a first mode of the optical transmitter comprising a first power, a second mode of the optical transmitter comprising a second power, a magnitude of the first power being lower than a magnitude of the second power;
    a first radio frequency detector coupled to the dual mode optical transmitter for detecting radio frequency signals of a first frequency range; and
    a second radio frequency detector coupled to the dual mode optical transmitter for detecting radio frequency signals of a second frequency range, the first radio frequency detector activating the first mode of the optical transmitter when a signal in the first frequency range is detected, the second radio frequency detector activating the second mode of the optical transmitter when a signal in the second frequency range is detected.

2. The optical network terminal of claim 1, wherein the optical transmitter generates low power optical signals while in the first mode and high power optical signals in the second mode.

3. The optical network terminal of claim 1, wherein the radio frequency signals of the first frequency range comprise radio frequency return signals produced by a set top box, and the radio frequency signals of the second frequency range comprise radio frequency signals produced by a cable modem.

4. The optical network terminal of claim 3, wherein the radio frequency signals of the second frequency range comprise radio frequency signals produced by a cable modem that produces its radio frequency signals according to DOCSIS.

5. The optical network terminal of claim 1, further comprising a diplexer coupled to both the first and second radio frequency detectors.

6. The optical network terminal of claim 1, further comprising a wavelength division multiplexer coupled to an output of the dual mode optical transmitter.

7. The optical network terminal of claim 1, further comprising an analog optical receiver for receiving downstream optical signals and converting the signals into the electrical domain.

* * * * *